(12) United States Patent
Shevade et al.

(10) Patent No.: US 11,722,390 B2
(45) Date of Patent: Aug. 8, 2023

(54) ESTABLISHING SECURED CONNECTIONS BETWEEN PREMISES OUTSIDE A PROVIDER NETWORK

(71) Applicant: Amazon Technologies, Inc., Seattle, WA (US)

(72) Inventors: Upendra Bhalchandra Shevade, Herndon, VA (US); Daniel Massaguer, Herndon, VA (US); Kyle Benjamin Schultheiss, Centreville, VA (US); Gregory Rustin Rogers, Reston, VA (US)

(73) Assignee: Amazon Technologies, Inc., Seattle, WA (US)

( * ) Notice: Subject to any disclaimer, the term of this patent is extended or adjusted under 35 U.S.C. 154(b) by 43 days.

(21) Appl. No.: 16/846,112

(22) Filed: Apr. 10, 2020

(65) Prior Publication Data
US 2020/0244556 A1    Jul. 30, 2020

Related U.S. Application Data

(63) Continuation of application No. 14/274,477, filed on May 9, 2014, now Pat. No. 10,623,285.

(51) Int. Cl.
*H04L 43/08* (2022.01)
(52) U.S. Cl.
CPC .................. *H04L 43/08* (2013.01)
(58) Field of Classification Search
CPC ....... H04L 43/08; H04L 45/123; H04L 45/16; H04L 43/065; H04L 43/10; H04L 43/16; H04L 45/02; H04L 41/0654; H04L 43/0817

USPC .......................................................... 709/224
See application file for complete search history.

(56) References Cited

U.S. PATENT DOCUMENTS

| | | |
|---|---|---|
| 8,082,581 B2 | 12/2011 | Wu |
| 8,209,749 B2 | 6/2012 | Babula et al. |
| 8,261,341 B2 | 9/2012 | Stirbu |
| 8,443,435 B1 | 5/2013 | Schroeder |
| 8,543,734 B2 | 9/2013 | McDysan |
| 8,559,441 B2 | 10/2013 | Miyabe |
| 8,559,449 B2 | 10/2013 | Rao et al. |
| 8,612,599 B2 | 12/2013 | Tung et al. |
| 8,656,420 B2 | 2/2014 | Foster et al. |
| 8,705,394 B2 | 4/2014 | Venkatachalapathy et al. |

(Continued)

OTHER PUBLICATIONS

Amazon Web Services, "AWS Direct Connect: User Guide API Version", Oct. 22, 2013, pp. 1-42.

(Continued)

*Primary Examiner* — Meng Vang
(74) *Attorney, Agent, or Firm* — Robert C. Kowert; Kowert, Hood, Munyon, Rankin & Goetzel, P.C.

(57) ABSTRACT

A first analysis based on at least a subset of collected health metrics of a monitored resource is performed at a health monitoring service. If the first analysis indicates that the probability that the monitored resource is in an unhealthy state is above a threshold, a mitigation action that includes directing at least some of the workload away from the monitored resource is implemented. In addition, a remediation analysis of the monitored resource is started to determine, using at least one additional health metric that was not examined in the first analysis, whether a longer-term remediation action is to be initiated.

20 Claims, 19 Drawing Sheets

(56) References Cited

U.S. PATENT DOCUMENTS

| | | | |
|---|---|---|---|
| 9,172,602 B1* | 10/2015 | Dropps | H04L 49/3054 |
| 10,623,285 B1 | 4/2020 | Shevade et al. | |
| 2005/0129001 A1* | 6/2005 | Backman | H04L 45/00 |
| | | | 370/352 |
| 2006/0031461 A1 | 2/2006 | Mathur et al. | |
| 2006/0047809 A1 | 3/2006 | Slattery et al. | |
| 2006/0168475 A1 | 7/2006 | Segers et al. | |
| 2006/0250951 A1* | 11/2006 | Ueda | H04L 45/22 |
| | | | 370/217 |
| 2007/0211730 A1 | 9/2007 | Cuthbert et al. | |
| 2008/0046971 A1* | 2/2008 | Swander | H04L 63/1433 |
| | | | 726/3 |
| 2008/0181134 A1 | 7/2008 | Anerousis et al. | |
| 2009/0327821 A1 | 12/2009 | Bauerle et al. | |
| 2010/0122175 A1 | 5/2010 | Gupta et al. | |
| 2010/0162036 A1 | 6/2010 | Linden et al. | |
| 2010/0275262 A1 | 10/2010 | Anand et al. | |
| 2011/0013637 A1* | 1/2011 | Xue | G06Q 20/027 |
| | | | 370/395.5 |
| 2011/0126059 A1 | 5/2011 | Klein | |
| 2011/0145836 A1 | 6/2011 | Wheeler et al. | |
| 2011/0185398 A1* | 7/2011 | Kubota | G06F 21/41 |
| | | | 726/3 |
| 2011/0197097 A1 | 8/2011 | Beaty et al. | |
| 2013/0031424 A1 | 1/2013 | Srivastava et al. | |
| 2013/0227355 A1 | 8/2013 | Dake et al. | |
| 2013/0227672 A1* | 8/2013 | Ogg | H04L 63/1416 |
| | | | 726/12 |
| 2014/0075048 A1 | 3/2014 | Yuksel et al. | |
| 2014/0317276 A1* | 10/2014 | Tie | H04L 45/306 |
| | | | 709/224 |

OTHER PUBLICATIONS

Amazon Web Services, "Amazon Virtual Private Cloud", User Guide API Version, Oct. 1, 2013, pp. 1-143.
U.S. Appl. No. 15/716,201, filed Sep. 26, 2017, Davis, et al.
U.S. Appl. No. 14/869,905, filed Sep. 29, 2015, David Sean Russell.
U.S. Appl. No. 14/869,907, filed Sep. 29, 2015, David Sean Russell.
U.S. Appl. No. 14/192,476, filed Feb. 27, 2014, Shuai Ye.
U.S. Appl. No. 13/528,271, filed Jun. 20, 2012, Long X. Nguyen.
U.S. Appl. No. 14/274,546, filed May 9, 2014, Upendra Bhalchandra Shevade.
U.S. Appl. No. 14/274,534, filed May 9, 2014, Upendra Bhalchandra Shevade.

* cited by examiner

ESTABLISHING SECURED CONNECTIONS BETWEEN PREMISES OUTSIDE A PROVIDER NETWORK

This application is a continuation of U.S. patent application Ser. No. 14/274,477, filed May 9, 2014, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each virtual machine can be thought of as a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

In some data centers that have been set up to provide virtualized computing and/or storage facilities to external customers, a set of resources at the data center may be dynamically divided into resource pools, with each pool being made available for exclusive use by a given customer for designated periods of time. In one scenario, a virtual isolated network comprising numerous compute instances and/or other devices may be set up for a customer at a provider network, and the customer may be granted substantial networking configuration flexibility for the isolated virtual network. For example, customers may assign IP addresses of their choice with the isolated virtual network, set up subnets and routes, and so on, in a manner very similar to the way that network configuration settings could be selected at a customer-owned facility. The costs of connectivity between the customer's own data centers and the customer's resources within the provider network may, however, be dependent in some cases on the types of gateways that can be set up between the provider network and customer networks. Using complex proprietary network devices for gateways may negatively impact cost, performance, and/or resilience to failures in some scenarios. In addition, the use of some types of conventional session-oriented peer-to-peer routing protocols with complicated route selection logic may potentially lead to inefficient or sub-optimal routing for traffic flowing between provider networks and customer networks. Traditional techniques of detecting and responding to failures at various components involved in providing such connectivity can sometimes lead to unnecessarily high false positive rates and/or high false negative rates.

Figure 1:
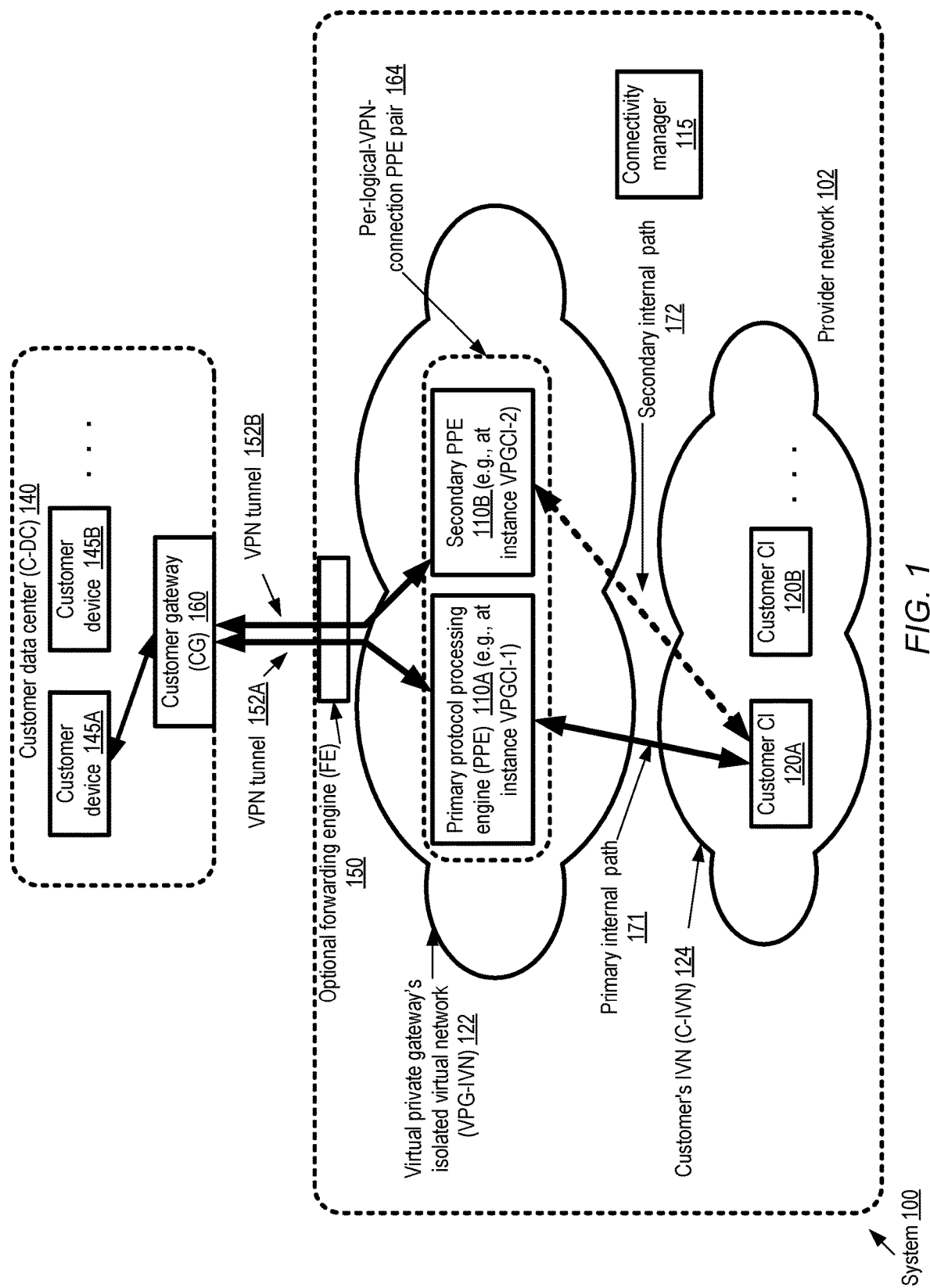
FIG. 1 illustrates an example system environment in which a virtual private gateway (VPG) for connectivity between a customer data center and a customer's isolated virtual network (IVN) within a provider network may be established using a second IVN, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing virtual private gateways (e.g., gateways that can be used for VPN (Virtual Private Network) connections) using compute instances at a provider network are described. Networks set up by an entity such as a company or a public sector organization to provide one or more network-accessible services (such as various types of cloud-based computing or storage services) accessible via the Internet and/or other networks to a distributed set of clients may be termed provider networks herein. Resources of some of the services may be used for supporting other services: for example, as described in detail below, gateways that enable secure VPN connectivity between a customer's external data centers and provider network resources allocated to the customer may be established using compute instances of a virtual computing service. The compute instances may, for example, be hosted on commodity hosts, and the resulting gateways may thus be much less expensive to implement than gateways that rely on special-purpose proprietary networking devices. In at least some embodiments, several administrative or "control-plane" services may be established within the provider network to enable the desired levels of scalability, availability and/or fault-resilience for the VPN functionality. For example, a multi-layer health monitoring service that is capable of analyzing collected health status information in several phases to initiate both short-term and long-term corrective actions for potential failures may be established in some embodiments. In one embodiment, a highly-available routing service may be set up within the provider network as well, e.g., to collect routing information using a simplified API (application programming interface) and compute routes in a centralized, more predictable manner than is possible when using only conventional session-oriented routing protocols.

In many cases virtualization technologies may be used to implement components of various provider network services. For example, a single computing device may be used to instantiate multiple virtual machines of a computing service, which may be referred to as "compute instances" (or simply "instances") herein, with the computing device being referred to as an "instance host". The virtual machines may serve as execution platforms for a variety of applications and service components, including, for example, protocol processing engines (PPEs) used to implement virtual private gateways as described below. An instance host may be utilized in either a single-tenant mode or a multi-tenant mode in different embodiments. In single-tenant mode, for example, a compute instance may be launched at the instance host on behalf of only a single customer, and as a result the resources of the instance host (e.g., processors, memory, storage and the like) may not be shared with other customers. In a multi-tenant environment, compute instances may be launched on behalf of several customers at the same instance host, without the customers necessarily being informed that the same host that is being used for their workload is also being used for other customers. Such transparent resource sharing may enable more effective use of the hardware resources of the provider network (e.g., typically, a higher average utilization level may be achieved in multi-tenant mode than in single-tenant mode). As described below, PPEs used for virtual private gateways may be implemented at instance hosts using either single-tenant mode or multi-tenant mode in different embodiments. As the likelihood of security breaches may be considered somewhat lower when only a single customer's traffic is flowing through an instance host than when multiple customer workloads are handled at a given instance host, single-tenant mode may be used for virtual private gateway PPEs in some implementations despite the possibility of lower overall resource utilization levels.

In at least some embodiments, a provider network may enable customers to set up "isolated virtual networks" (IVNs) at the provider's data centers. An IVN (which may also be referred to in some environments as a virtual private cloud or VPC) may comprise a collection of computing and/or other resources in a logically isolated section of the provider network, over which the customer is granted substantial control with respect to networking configuration. In some embodiments, for example, a customer may select the IP (Internet Protocol) address ranges to be used for the IVN resources, manage the creation of subnets within the IVN, and the configuration of route tables etc. for the IVN. For at least some of the devices within an IVN in some embodiments, the network addresses may not be visible outside the IVN, at least by default. In addition to enabling customers to set up logically isolated networks for their applications, IVNs may also be used by the provider network itself to support various features such as VPN connectivity in some embodiments. In order to enable connectivity between a customer's IVN and the customer's external network (e.g., devices at the customer's data center or office premises), a virtual private gateway (VPG) may be set up in one embodiment using a dedicated IVN whose network configuration settings are selected by administrative components of a connectivity service of the provider network, rather than by an external customer. Such a dedicated IVN used primarily or entirely for implementing a virtual private gateway may be referred to as a VPG-IVN to distinguish it from IVNs set up for implementing customer applications. The virtual private gateway may serve as a network concentrator on the provider network side of the path between a customer's data center and the customer's IVN within the provider network. In some embodiments one or more VPN (virtual private network) connections may be configured between a customer's IVN and external networks (such as the customer's office network or the customer's data centers) using PPEs instantiated at compute instances within the VPG-IVN. A variety of different protocols may be used for connections between the customer IVNs and the external networks in different implementations—e.g., IPSec (Internet Protocol Security), SSL/TLS (Secure Sockets Layer/Transport Layer Security), DTLS (Datagram Transport Layer Security) and the like.

According to one embodiment, a set of programmatic interfaces (e.g., APIs, web pages, custom graphical user interfaces, command-line tools or the like) may be implemented by the provider network to enable customers to utilize VPN-related features of a connectivity service of the provider network. A request via such a programmatic interface may be received, e.g., at a connectivity manager component of the provider network's connectivity service, to establish a VPN connection between (a) a customer data center of a particular customer C1 and (b) C1's IVN within the provider network. The connectivity manager may determine whether a compute instance-based virtual private gateway (VPG) has previously been set up on behalf of C1. If no such pre-existing VPG is found, a new IVN may be configured for a VPG to be established for the customer. The internal configuration of this special-purpose IVN (which, as mentioned earlier, may be referred to as a VPG-IVN) may be controlled by the connectivity manager (in contrast to C1's IVN, for which networking configuration choices may be made by C1). In some embodiments, the connectivity manager itself may comprise a plurality of physical and/or logical components that may be distributed across multiple data centers of the provider network.

In at least some embodiments, a plurality of compute instances may be launched within the VPG-IVN at the request of the connectivity manager, e.g., at respective instance hosts used in single-tenant mode. For example, the connectivity manager may transmit instance launch requests specifying various characteristics of the instances required (e.g., the instance types or performance capabilities, as discussed below in further detail) to the virtual computing service using the virtual computing service's API. At least a pair of protocol processing engines (PPEs) (e.g., each comprising one or more processes at a compute instance) may be started up at respective compute instances of the VPG-IVN in one implementation. The establishment of respective VPN tunnels may then be initiated between the PPEs of the pair and C1's data center. For example, in one implementation, the customer may invoke the equivalent of a "CreateVPNConnection" API followed by a "DescribeVPNConnection" API, and the response to the DesrcibeVPNConnection API may include configuration settings to be applied at the customer's gateway to establish the tunnels. In such an implementation, the configuration information for the customer gateway may include addresses of two VPN head-ends within the provider network, e.g., one at each PPE of the pair. In embodiments in which IPSec is to be used for the VPN, the configuration may also contain a pre-shared secret key. The key may be used, in accordance with the IKE (Internet Key Exchange) protocol to set up a security association (SA) for each tunnel. In some embodiments, an IKE SA may remain valid for some number of hours (e.g., eight hours), and may in turn be used to establish an IPSec SA, which may have its own validity period (e.g., one hour). The IPSec SA may then be used to encrypt data traffic over the VPN connection.

In some embodiments, at a given point in time, one PPE of the plurality of PPEs may be considered the primary or active PPE, and its VPN tunnel may be considered the primary pathway of the VPN connection, while at least one of the other PPEs and its tunnel may be considered secondary or standby resources. As described below, in response to a determination that a failure may have occurred at the primary PPE (e.g., that a probability of a failure at the primary PPE is above a threshold), a health monitoring service of the provider network may rapidly initiate a transition of the secondary PPE to a primary role in some embodiments. In at least some embodiments, a routing service of the provider network may be responsible for initially designating one of the PPEs as the primary or active PPE and another as the secondary or passive PPE.

In order for packets to flow between specific customer devices in C1's data center and various resources within C1's IVN, routing information may have to be exchanged for both ends of the VPN connection in at least some embodiments. In one embodiment, for example, the customer gateway may establish a respective BGP (Border Gateway Protocol) session with each of the two PPEs. Customer-side routing information may be provided to the PPEs using these BGP sessions. Within the provider network, in at least some embodiments a centralized routing service may be implemented as described below. The PPEs may send the received customer-side routing information to the routing service, e.g., via an HTTPS (HyperText Transfer Protocol Secure) based or HTTP (HyperText Transfer Protocol) based internal routing information exchange API implemented by the routing service. The customer-side routing information may be stored within a persistent repository of the routing service, which may also include internal routing information pertaining to provider network resources (such as route settings of C1's IVN). Back-end rules engines of the routing service may analyze the collected internal and external routing information, e.g., in view of one or more routing policies of the provider network, to compute or select routes to be used for between various pairs of endpoints. The routing service may provide routing information pertaining to devices within C1's IVN to the pair of PPEs in some embodiments. Such routing information may be translated into the appropriate BGP messages at the PPEs, and provided to the customer gateway via the respective BGP sessions. Thus, the customer gateway may be informed regarding routes to C1's IVN, while the VPG set up for C1 may be informed regarding routes to the customer data center. Using the routing information, packets of customer C1's traffic may be transmitted in either direction between C1's data center and C1's IVN. Protocols other than IPSec, IKE, and/or BGP may be used in various embodiments.

In at least one embodiment, the provider network may support the use of "virtual network interfaces" (VNIs) that can be dynamically attached to or detached from a compute instance. VNIs may also be referred to as "elastic network interfaces" in some environments. A VNI may have a set of attributes, including for example at least one private IP address (e.g., an address that is not visible outside the provider network), security settings, a MAC address, source/ destination check flag settings, and the like, that can be transferred from one instance to another by programmatically detaching the VNI from the first instance and programmatically attaching it to the other instance. In some embodiments, one VNI may be created and attached to a compute instance at which a PPE is implemented for encrypted traffic to or from the customer data center, while a second VNI may be created and attached to the compute instance for decrypted traffic to or from the customer's IVN. The second VNI may, for example, be configured with an IP address that belongs to a range of addresses set up for the customer's IVN.

In one embodiment, a single VPG may be usable for a variety of connectivity purposes. For example, consider a scenario in which a customer C1 has two data centers DC1 and DC2, each of which are to be connected to the same customer IVN via a respective VPN connection. To handle this use case, two pairs of PPEs may be set up within a single VPG set up for C1: one pair of PPEs for a pair of tunnels for the first VPN connection, and another for a second pair of tunnels for the second VPN connection. In some cases, instead of using the instance-based VPG for secure connectivity between external data centers and customer IVNs, the VPG may be used for secure transmission of traffic between customer data centers, e.g., in a hub-and-spoke configuration. The hub-and-spoke layout may also be implemented using respective pairs of PPEs at the VPG (the "hub") for each data center (a respective "spoke") and ensuring that the appropriate routing information is made available to at least one of the PPEs of each pair (e.g., by a routing service similar to that discussed above). In one embodiment, direct physical links may be established at customer request between a customer router and a provider network router at a router co-location facility or transit center. Such dedicated physical links, which may be referred to as "direct connect" links in some environments, may also be used in conjunction with instance-based VPGs to enable traffic to flow securely between different data centers of the same customer, e.g., by establishing tunnels between the provider network router and the PPEs associated with other customer data centers.

In some embodiments, the virtual computing service of the provider network may support a variety of compute instance categories, e.g., "small", "medium" and "large" compute instances that differ from each other in relative computing power, memory, storage space, network bandwidth and the like. Since the amount of traffic being handled via a particular VPN connection may vary from one customer to another, and may also vary for the same customer over time, the instance category that is best suited for a given VPG may also differ from one customer to another and/or from one time period to another. Based on monitoring the traffic associated with a particular VPN connection or set of VPN connections, a decision may be made (e.g., by the connectivity manager or the health monitoring service) to transition to the use of a different instance type for a customer's VPG. One PPE of the PPE pair set up for a particular VPN connection may be transitioned (e.g., either dynamically, or as part of a maintenance window) to a different instance type while the other PPE is configured as the primary, for example, and then the same types of transition may be accomplished for the second PPE of the pair. In some embodiments, depending on the amount of VPN traffic, multiple PPEs corresponding to different VPN connections may be hosted at the same instance. In one implementation, a single PPE may be used for multiple VPN connections. In some embodiments, the provider network may allow customers to choose from among a variety of availability levels or availability policies for their VPN connections. If a customer indicates a preference for a low-availability (and potentially lower-price) VPN connection, a single PPE rather than a pair of PPEs may be set up for such a connection in some embodiments.

As mentioned earlier, a health monitoring service (HMS) may be implemented at a provider network in some embodiments, e.g., to ensure that potential problems with VPN connectivity (as well as other types of provider network services) are dealt with promptly and effectively. In at least one embodiment, front-end nodes of the HMS may collect health status metrics for monitored resources using a variety of techniques, and store the collected information in a persistent repository of the HMS for analysis by back-end decision nodes of the HMS. For example, any combination of the following types of information may be obtained with respect to VPNs implemented using the kinds of techniques described above: respective self-health-check metrics from subcomponents of the PPEs (e.g., an IPSec processing module of a PPE may provide results of internal tests to the HMS), responses to programmatic status queries supported by a virtual computing service being used for PPEs, peer health status reports from a peer group of PPEs (e.g., other PPEs within the VPG-IVN), and/or protocol verification metrics obtained using at least one network pathway established to emulate interactions of the PPEs with the customer data center. At least two stages or modes of analysis may be performed on the health metrics data collected over a particular time period in some embodiments. In a first phase, a relatively rapid analysis may be undertaken (e.g., using a few selected key metrics) that determines whether the probability of a failure at a monitored resource is above a first threshold. If the probability is above the threshold, a rapid-response mitigation action may be undertaken, e.g., by making configuration changes that have the effect of replacing the primary PPE with its corresponding secondary. In some scenarios, a first analysis that results in such a mitigation action may then be followed by a more detailed secondary analysis, e.g., to determine whether additional longer-term remedial actions should to be taken. If the resource whose failure probability exceeded the threshold is found to be experiencing longer term problems, or the probability of failure determined using the detailed analysis increases even further, for example, the problematic resource may be taken offline and replaced by a new resource (e.g., a new instance and/or a new instance host) in some embodiments. Thus, by examining health metrics collected from a variety of sources, and by performing several different analyses at respective levels of detail, resource health status may be determined with a higher degree of soundness and completeness than may be possible using some conventional health monitoring techniques.

Many conventional routing protocols such as BGP rely on fairly complex decision making, and on a distributed, non-trusting peer-to-peer approach to disseminating routing updates that at least in some cases may lead to poor route selection. Accordingly, in at least one embodiment, a routing service may be implemented in the provider network, which collects route updates via a simpler HTTP or HTTPS-based set of programmatic interfaces (e.g., interfaces that are invoked by the PPEs) and stores the collected route information (e.g., the equivalent of routing information bases (RIBs)) in a highly available persistent store. Instead of relying on a distributed set of peers for performing route computations (e.g., generating forwarding information base or FIB entries from the RIB entries), a logically centralized rules processing engine or engines may be instantiated to perform the routing computations. The results of the routing computations may be disseminated to interested parties, such as the PPEs and various routers affiliated with different provider network services. Because the routing computations are performed by nodes of the routing service that have access to a larger set of routing information than may have been available at a single BGP endpoint, and because the convergence period that is typically required in peer-to-peer decision making may be avoided, the routing service may in general be able to provide better routing information more quickly than would have been possible using conventional protocols. The health status of the nodes of the routing service may be monitored by the HMS in some embodiments to ensure the desired level of availability and reliability. Just as the HMS may be used for other purposes in addition to ensuring high availability for the VPGs, the routing service may also be employed for more than just VPN connectivity in some embodiments. Further details regarding the instance-based VPGs, the HMS, the routing service, and the interactions between the VPG PPEs, the HMS and the routing service are provided below.

Example System Environment

FIG. 1 illustrates an example system environment in which a virtual private gateway (VPG) for connectivity between a customer data center and a customer's isolated virtual network (IVN) within a provider network may be established using a second IVN, according to at least some embodiments. As shown, system 100 comprises a provider network 102 that includes a plurality of resources which may be used to implement a variety of network-accessible multi-tenant and/or single-tenant services. A virtual computing service of the provider network 102 may implement programmatic interfaces (e.g., APIs, web pages, command-line tools or the like) that enable customers to request allocation of virtualized compute servers called compute instances. In the depicted embodiment, the virtual computing service may also enable customers to request the establishment of isolated virtual networks (IVNs), such as C-IVN 124, within which at least some of the customer's instances may be launched. As described above, a customer IVN may comprise a plurality of resources placed within a logically-isolated portion of the provider network, over which the customer is granted substantial administrative control with respect to various aspects of network configuration, such as the assignment of IP addresses to various devices, the establishment of subnets, and so on. At least some of the IP addresses assigned to IVN resources, such as customer CIs (compute instances) 120A and 120B may be "private", e.g., the addresses may not be accessible from or advertised on the public Internet or from other customers' IVNs within the provider network. IVN functionality may in effect allow customers to dynamically increase or decrease the number of computing and/or storage resources that can be deployed for various applications, while maintaining a level of network isolation and security that is close to (or better than) the corresponding levels of isolation and security achievable at the customer's own data centers.

At least for certain types of applications, customers may wish to establish secure communication channels (e.g., using any appropriate VPN (Virtual Private Network) protocol) between their external data centers and their IVNs. For example, in the depicted scenario, secure connectivity may be needed between customer device 145A at customer data center (C-DC) 140, and customer CI 120A at C-IVN 124. In general, the customer may want to allow network traffic from any customer device 145 (e.g., 145A, 145B, etc.) at C-DC 140 to flow securely to any customer CI 120 within C-IVN 124, and from any customer CI 120 within C-IVN 124 to any customer device 145 within C-DC 140. A connectivity service of the provider network, which may include one or more computing devices that implement administrative components referred to collectively herein as a connectivity manager 115, may implement a set of programmatic interfaces to support VPNs and/or other forms of secure communications between customer resources and provider network resources in the depicted embodiment.

Using a programmatic interface of the connectivity manager 115, a customer may request an establishment of a VPN connection between C-DC 140 and C-IVN 124 in the depicted embodiment. If a virtual private gateway does not already exist for the specified network pair (i.e., the C-IVN and the customer data center network), a virtual private gateway (VPG) may be configured for the requested VPN connection. A dedicated IVN 122 may be established by the connectivity manager 115 for the connectivity needs of customer C, and one or more PPEs (protocol processing engines) may be started up on compute instances within the IVN to implement the VPG. Unlike C-IVN, whose networking configuration is (at least largely) controlled by the customer, the configuration of the IVN to be used for the VPG may be controlled by the connectivity manager 115. This second IVN may be referred to as a "VPG-IVN", to distinguish it from C-IVN within which the customer CIs are implemented. In the depicted embodiment, VPG-IVN 122's instances may be used entirely for connectivity purposes; thus, customer application code may typically not be executed within VPG-IVN 122. The number of PPEs that are established for a given VPN connection, and the mappings between PPEs and VPG-IVN compute instances and hosts, may differ in various embodiments. In the depicted embodiment, at least a pair 164 of protocol processing engines (PPEs) may be started up for the VPN connection between C-IVN 124 and C-DC 140—e.g., a primary PPE 110A at a first compute instance VPGCI-1, and a secondary PPE 110B at a second compute instance VPGCI-2. Each PPE may comprise one or more processes or threads of execution, for example.

A respective VPN tunnel (e.g., 152A and 152B) may be established between each PPE of PPE-pair 164 and a customer gateway (CG) 160 of the customer's data center. The establishment of such a tunnel 152 may involve the transmission of a set of configuration information from the connectivity manager 115 to the customer data center, where one or more settings indicated in the configuration information may be applied to the customer gateway (CG) 160. In one implementation, for example, to initiate the VPN connection, a client process or thread at C-DC 140 may issue a "CreateVPNConnection" request programmatically. In response, a new object representing a yet-to-be-fully-configured VPN connection may be generated by the connectivity manager 115, and an identifier of the connection may be provided to the client. The client may then submit a "DescribeVPNConnection" request with the identifier as a parameter, and receive a set of configuration information and/or instructions. The instructions may include, for example, IP addresses of the PPEs 110A and 110B which are designated as VPN endpoints within the provider network.

In embodiments in which IPSec is to be used for the VPN, a secret key may also be provided in the DescribeVPNConnection response (or in response to an invocation of a different API). The key may be used in accordance with the IKE (Internet Key Exchange) protocol to set up a security association (SA) for each of two tunnels to be established between the customer gateway 160 and the PPEs. In some embodiments, the IKE SA may then be used to establish an IPSec SA, and the IPSec SA may be used to encrypt subsequent data traffic over the VPN tunnels.

A single logical VPN connection between the customer data center and the customer's IVN may thus comprise two separate tunnels 152A and 152B. The term "dual-tunnel VPN connection" may be used herein to refer to the combination of two tunnels such as 152A and 152B configured for a single logical VPN connection. One of the tunnels (e.g., 152A) may be configured as the primary tunnel of the VPN connection (e.g., using the appropriate routing settings) in some embodiments. For example, tunnel 152A may carry a majority (or all) of the VPN traffic between customer device 145A (which sends its outbound traffic to customer gateway 160) and customer CI 120A (which sends its outbound VPN traffic to PPE 110A via a primary internal path 171, and similarly, receives inbound VPN traffic from PPE 110A via primary internal path 171). The VPN tunnels may typically be used for encrypted data packets, while the packets on the internal paths may at least in some embodiments be unencrypted. In at least some embodiments, the secondary PPE 110B may also be used for at least some of the VPN traffic between the customer data center and customer CI 120A (e.g., via secondary internal path 172). In one embodiment, the initial selection of one of the PPEs as the primary or active PPE may be made by a routing service of the provider network. In some embodiments, the secondary PPE may be granted the primary role on the event of a failure at the primary PPE (or in the event that the probability of a potential failure of the primary PPE, as estimated by a health management service, exceeds a threshold), as described below in further detail. In one embodiment, in response to a detection of an overload condition at the primary PPE, some of its workload may be offloaded to the secondary PPE by making the appropriate network configuration changes.

In the depicted embodiment, routing information pertaining to C-IVN's resources (e.g., various compute instances 120) may be provided to the customer gateway 160 via at least one of the PPEs 110A or 110B. Similarly, routing information pertaining to the customer data center (e.g., routing changes with respect to various customer devices 145) may be provided to at least one PPE of the PPE pair 164 from the customer gateway 160. The PPEs may receive and respond to routing-related messages formatted according to any of various routing protocols in various embodiments, including for example session-oriented protocols such as BGP, as well as internal protocols such as an HTTPS-based protocol that may be supported within the provider network by a routing service as described below. The PPEs may in some embodiments act as translators of routing information—e.g., receiving BGP-based information from the customer data center, transmitting the received information over HTTP or HTTPS to the routing service within the provider network, and performing the reverse type of translation in the opposite direction for routing information originating at the routing service.

In one embodiment, virtual private gateways established using proprietary routers (e.g., instead of using compute instances within an IVN) may have been used for VPN connectivity for some time before the introduction of IVN-based VPGs. To ease the transition to the new scheme for existing VPN customers, one or more forwarding engines (FEs) 150 may optionally be used. Since the customer gateway 160 may already be aware of the proprietary router IP addresses as VPN endpoints, an FE 150 may be used to perform network address translation (NAT) in both directions in such an embodiment, ensuring for example, that IPSec or IKE traffic intended for the proprietary routers is instead sent to the PPEs, and that IPSec traffic from the PPEs to the customer gateway appears to originate at the proprietary router IP address. Forwarding engines may not be used in some embodiments.

Figure 2:
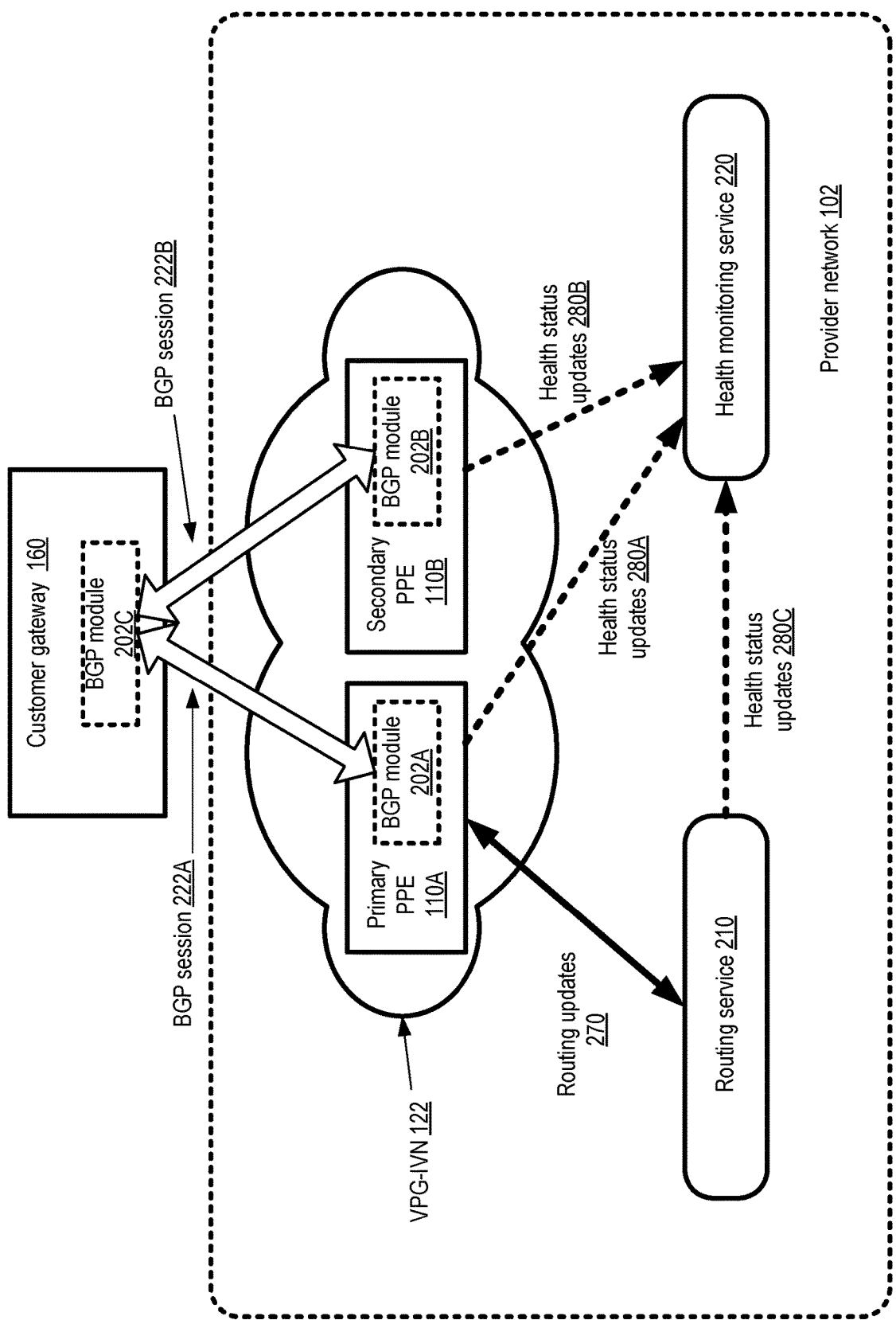
FIG. 2 illustrates example control-plane interactions associated with VPN (virtual private network) connection management at a provider network, according to at least some embodiments.

FIG. 2 illustrates example administrative ("control-plane") interactions associated with VPN (virtual private network) connection management at a provider network, according to at least some embodiments. In the depicted embodiment, the customer gateway uses BGP as its primary routing protocol. (Other routing protocols may be used in other embodiments.) As shown, respective BGP sessions 222A and 222B may be established between the customer gateway 160 and the PPEs 110A and 110B at a VPG-IVN 122. PPE 110A may comprise a BGP processing module 202A which participates in session 222A with a customer gateway BGP module 202C; similarly, PPE 110B may comprise a BGP processing module 202B that participates in session 222B with BGP module 202C of customer gateway 160. Routing changes and other BGP messages (e.g., messages indicating local preferences, weights, multi-exit discriminators (MEDs) and/or other routing attributes) may be received by the PPEs 110 from the customer gateway in the depicted embodiment, and transmitted for storage and analysis to a routing service 210. The internal routing updates 270 may use a routing service protocol different from BGP in at least some embodiment. For example, instead of using a session-oriented approach, a less stateful technique may be used in which the PPEs send routing messages via HTTPS or HTTP to the routing service. The routing information received from the PPEs may be stored in a persistent store of the routing service, such as a highly available distributed database system implemented at the provider network. At the routing service, aggregated routing information collected from a variety of sources may be analyzed to perform routing computations (e.g., shortest path or optical path calculations), which may be provided to the PPEs 110. The PPEs in turn may propagate the results of the routing computations to other routing devices, e.g., via BGP to the customer gateway 160. The routing service 120 may be implemented as multiple layers fronted by load balancers in some embodiments, as described below in further detail.

In the embodiment depicted in FIG. 2, the PPEs 110A and 110B, as well as various resources of the routing service 210, may be monitored by a health monitoring service (HMS) 220 of the provider network, as indicated by the health monitoring updates arrows labeled 280A, 280B and 280C. The health monitoring service 220 may perform several levels of analysis in some embodiments, starting with a relatively rapid first analysis to identify potential problems that may require immediate attention. If, for example, the HMS determines, based on the first stage of analysis of its collected health metrics, that the probability that a failure primary has occurred at PPE is above some threshold, the role of primary PPE may be revoked and instead granted to PPE 110B. Asynchronously, the HMS may perform a deeper level analysis, e.g., taking more metrics into account or a longer time window of metrics into account, to determine a more accurate estimate of PPE 110A's failure and/or to confirm whether PPE 110A actually failed. Depending on the results of the more detailed analysis, the HMS may initiate longer-term actions, e.g., by requesting a resource provisioning service of the provider network to provide a replacement host or a replacement compute instance. Further details regarding various features of the HMS are provided below. As also described below, interactions between the routing service (or other services monitored by the HMS) and the HMS may occur in both directions in some embodiments: e.g., when a secondary PPE is to be reconfigured as a primary PPE, in at least some embodiments the HMS may request or direct the routing service to implement the reconfiguration.

PPE Components

Figure 3:
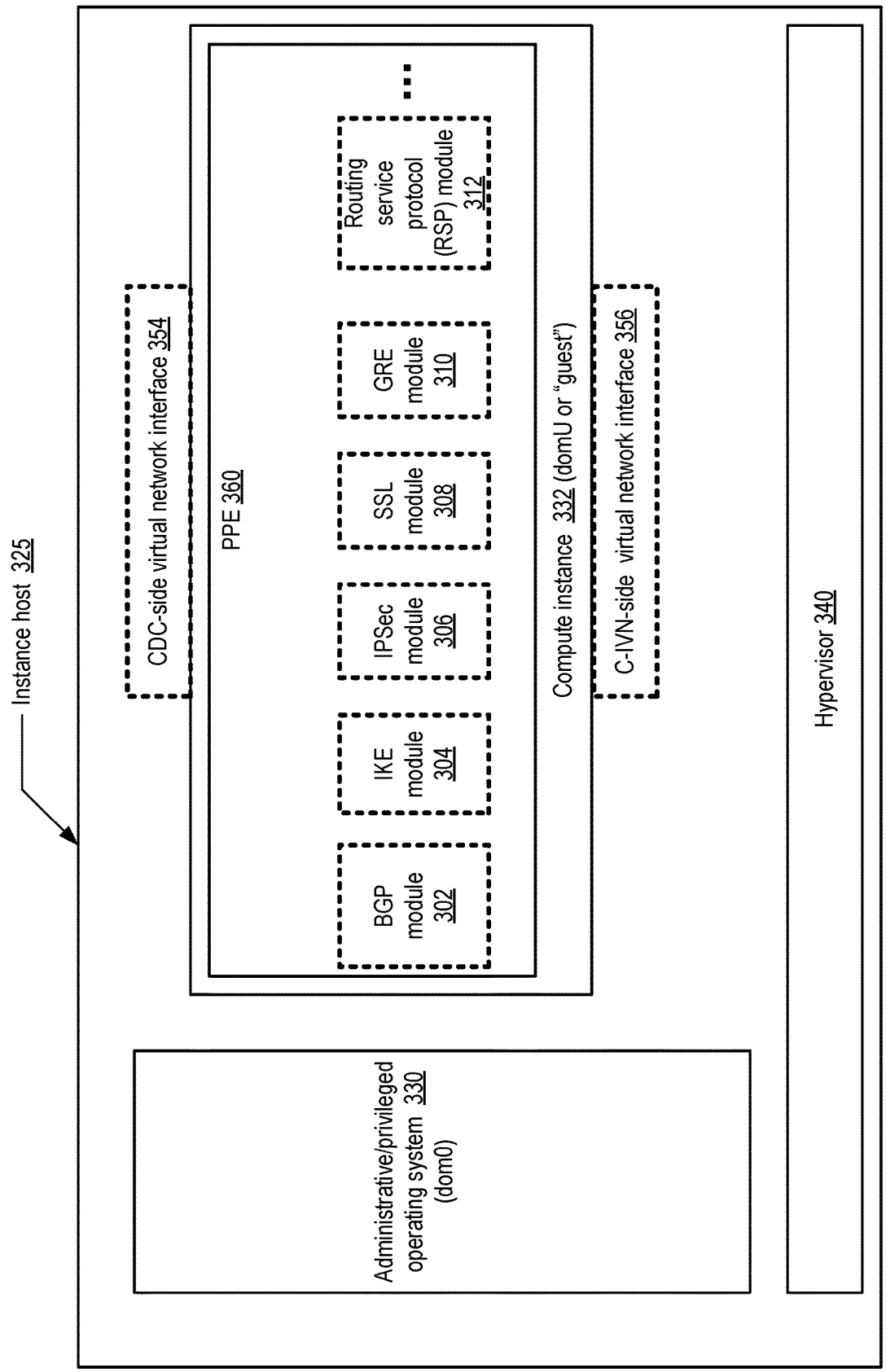
FIG. 3 illustrates example subcomponents of a protocol processing engine (PPE) of a VPG, implemented at a compute instance of a provider network, according to at least some embodiments.

FIG. 3 illustrates example subcomponents of a protocol processing engine (PPE) of a VPG, implemented at a compute instance of a provider network, according to at least some embodiments. As mentioned earlier, a virtual computing service of the provider network may include numerous instance hosts, each of which may be capable of hosting multiple instances. In the depicted embodiment, a PPE 360 is implemented at a compute instance 332 of an instance host 325. The instance host 325 may comprise a plurality of hardware components (not shown in FIG. 3), which may include, for example, some number of processing cores or processors, at least one non-persistent memory which may be referred to as a main memory, one or more local persistent storage devices such as disks, and one or more network interface cards (NICs). Optional peripheral devices such as one or more monitors, mice, and the like may also be attached to the instance host in some implementations.

The hardware resources of the instance host 325 may be virtualized (e.g., presented to one or more virtual machines such as compute instance 332 booted or launched at the instance host as though each of the instances had exclusive access to the hardware) with the help of a virtualization management software stack that comprises a hypervisor 340 and/or an administrative instance of an operating system 330 in the depicted embodiment. The administrative instance of the operating system may be referred to as a "privileged domain" labeled "domain 0" or "dom0" in some implementations, while respective operating systems established for each of the compute instances 332 may be referred to as "unprivileged domains" (labeled "domU"), "guest virtual machines", "guest operating systems", or "guest domains". When a hardware component (such as a NIC used for incoming or outgoing traffic of the PPE 360) is to be utilized by a compute instance 332, e.g., due to an operation requested by the operating system or by an application running on top of the operating system, the hypervisor 340 may typically act as an intermediary between the instance and the hardware component. In some cases, depending for example on the programmatic interfaces being used, both the hypervisor 340 and the administrative operating system instance 330 may be intermediaries between the instance and the hardware. In at least some embodiments, a number of programmatic interfaces may be available to query the status of the compute instance(s) running on an instance host, the status of the administrative instance 330, and/or the status of the hypervisor 340. Such interfaces, which may form part of the control-plane of the virtual computing service, may be used by the health monitoring service to obtain health metrics in some embodiments as described below.

In the depicted embodiment, the PPE 360 instantiated at compute instance 332 comprises a number of subcomponents. The PPE 360 may in some embodiments comprise one or more processes or threads running on the compute instance. In at least some embodiments, a compute instance 332 may be primarily intended for use as a PPE, e.g., there may not be any other significant consumers of processing, memory, storage or networking resources at the instance than the PPE (and the underlying operating system). A given PPE may be able to process messages of a number of different protocols in the depicted embodiment, using respective modules. For example, PPE 360 may include a BGP module 302, an IKE module 304, an IPSec module 306, an SSL/TLS module 308, a GRE (Generic Routing Encapsulation) protocol module 310, a module for the routing service's protocol (RSP) 312, and so on. At least some of the modules may be able to invoke programmatic interfaces of the other modules, e.g., the BGP and RSP modules may communicate with each other to translate BGP messages into RSP messages. In some embodiments, at least some of the components of the PPE may be implemented as respective daemons, processes or threads.

In some embodiments, compute instance 332 may have at least two virtual network interfaces (VNIs) attached for use by the PPE. VNI 354 may be used primarily for communications with the customer data center (e.g., communications with customer gateway 160) and is hence labeled a "CDC-side VNI" in FIG. 3. VNI 356 may be used primarily for communications with the customer's IVN, and is hence labeled a "C-IVN-side VNI" in FIG. 3. Other VNIs may also be attached to PPE 360's compute instance 332 in some embodiments, e.g., for control-plane interactions with the routing service and/or the HMS.

Additional Topologies Using Instance-Based VPGs

Figure 4:
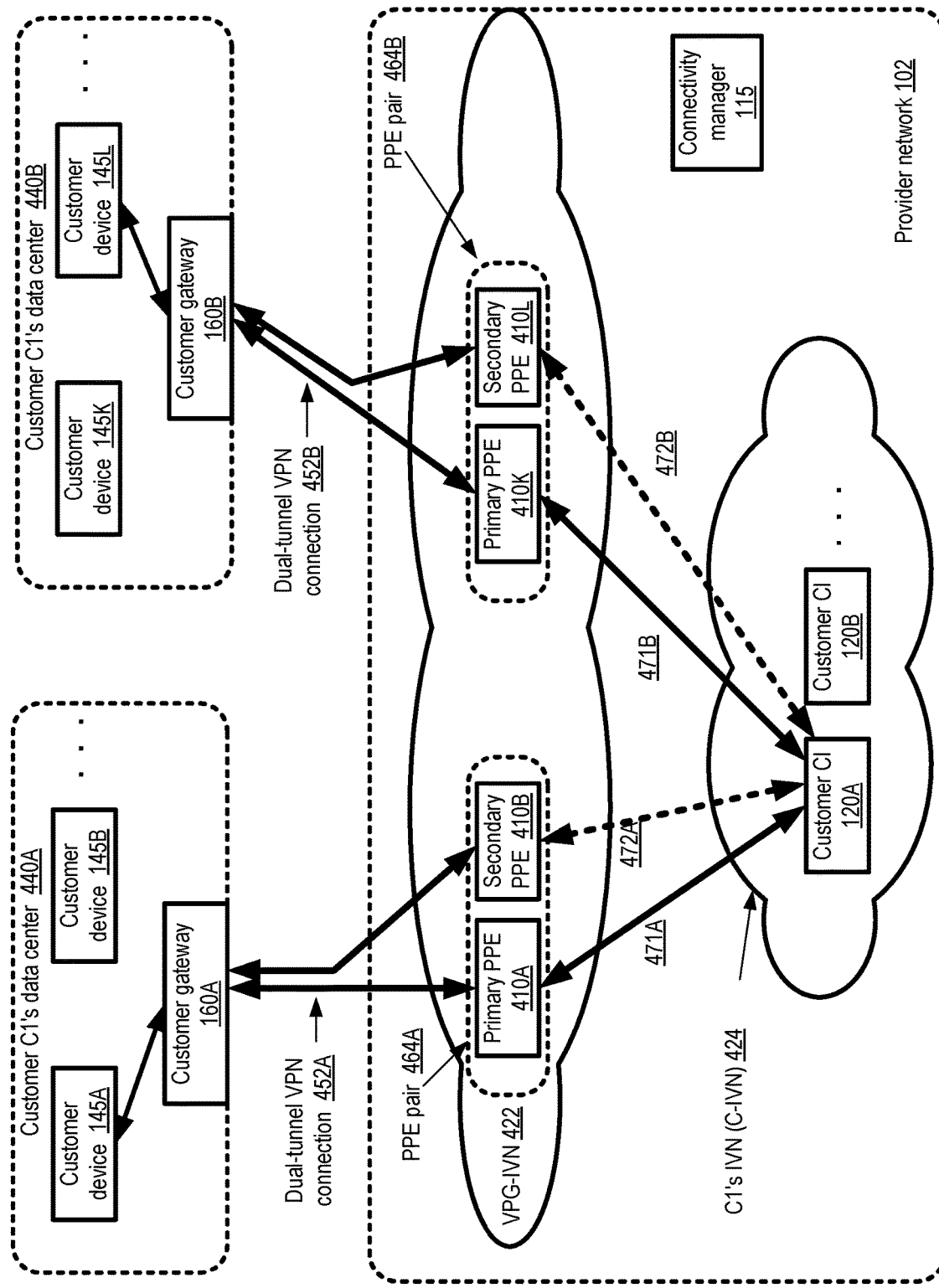
FIG. 4 illustrates an example configuration in which respective pairs of PPEs within a given IVN established for a VPG are set up for connectivity to respective customer data centers, according to at least some embodiments.

FIG. 1 illustrated a scenario in which an instance-based VPG comprising a pair of PPEs was used for VPN connectivity between a single customer data center and the customer's IVN within the provider network. Some customers may wish to establish secure communications between a plurality of their data centers and their IVNs. FIG. 4 illustrates an example configuration in which respective pairs of PPEs within a given IVN established for a VPG are used for connectivity to respective customer data centers, according to at least some embodiments.

Customer C1 has two data centers 440A and 440B in the depicted embodiment. Secure communications via respective VPN connections are to be established between each of the data centers and the customer's IVN 424. As shown, a single VPG-IVN 422 may be established for the customer, with at least a pair of PPEs configured for each desired VPN connection. Thus, PPE pair 464A comprising primary PPE 410A and secondary PPE 410B is established for a dual-tunnel VPN connection 452A to customer gateway 160A at data center 440A. Similarly, PPE pair 364B comprising primary PPE 410K and secondary PPE 410L is set up for a dual-tunnel VPN connection 452B to customer gateway 160B at data center 440B. The order in which the two dual-tunnel VPN connections 452A and 452B are established may depend on when the VPN connection requests for the two customer data centers are received at the connectivity manager 115 relative to each other. For example, if the request for data center 440B is received first, the connectivity manager may have established VPG-IVN 422 and instantiated PPEs 410K and 410L first, and added PPEs 410A and 410B later to the IVN when the request for data center 440A was received. In some embodiments, it may be possible to submit a single programmatic VPN establishment request for multiple VPN connections, in which case the connectivity manager may establish the VPG-IVN and set up both pairs of PPEs before the tunnels to each data center are established.

After the tunnels for the VPN connections are set up, e.g., using IKE and/or IPSec as described above, routing information may be exchanged in both directions. Routing information enabling PPE 410A (or 410B) to send packets originating at customer CI 120A to customer device 145A may be received from customer gateway 160A. Similarly, routing information enabling PPE 410K (or 410L) to send packets originating at customer CI 120A to customer device 145L may be received from customer gateway 160B. As described above, the received routing information may be passed on to the routing service by the PPEs. For traffic flowing in the other direction, routing information pertaining to C-IVN 424 may be passed from the PPEs 410A and 410B to the customer gateways 160A and 160B. In some embodiments, primary internal paths 471A and 471B may be used for much of the customer's data traffic as long as PPEs 401A and 410B remain designated as the primary PPEs of their respective pairs. The secondary paths 472A and/or 472B may become the primary paths in the event of failures at the primary PPEs, for example. In some embodiments, both PPEs of a given pair may be used, e.g., to balance traffic workloads, instead of designating one as the primary and one as the secondary. In at least one embodiment, instead of increasing the number of PPEs within a single VPG-IVN as the number of data centers to be connected to a given C-IVN increases, respective VPG-IVNs may be set up for connectivity to the different data centers. In one embodiment, if customer C1 has two or more IVNs within the provider network, the same VPG-IVN may be used for connectivity between a given customer data center and any of the customer's IVNs.

Figure 5:
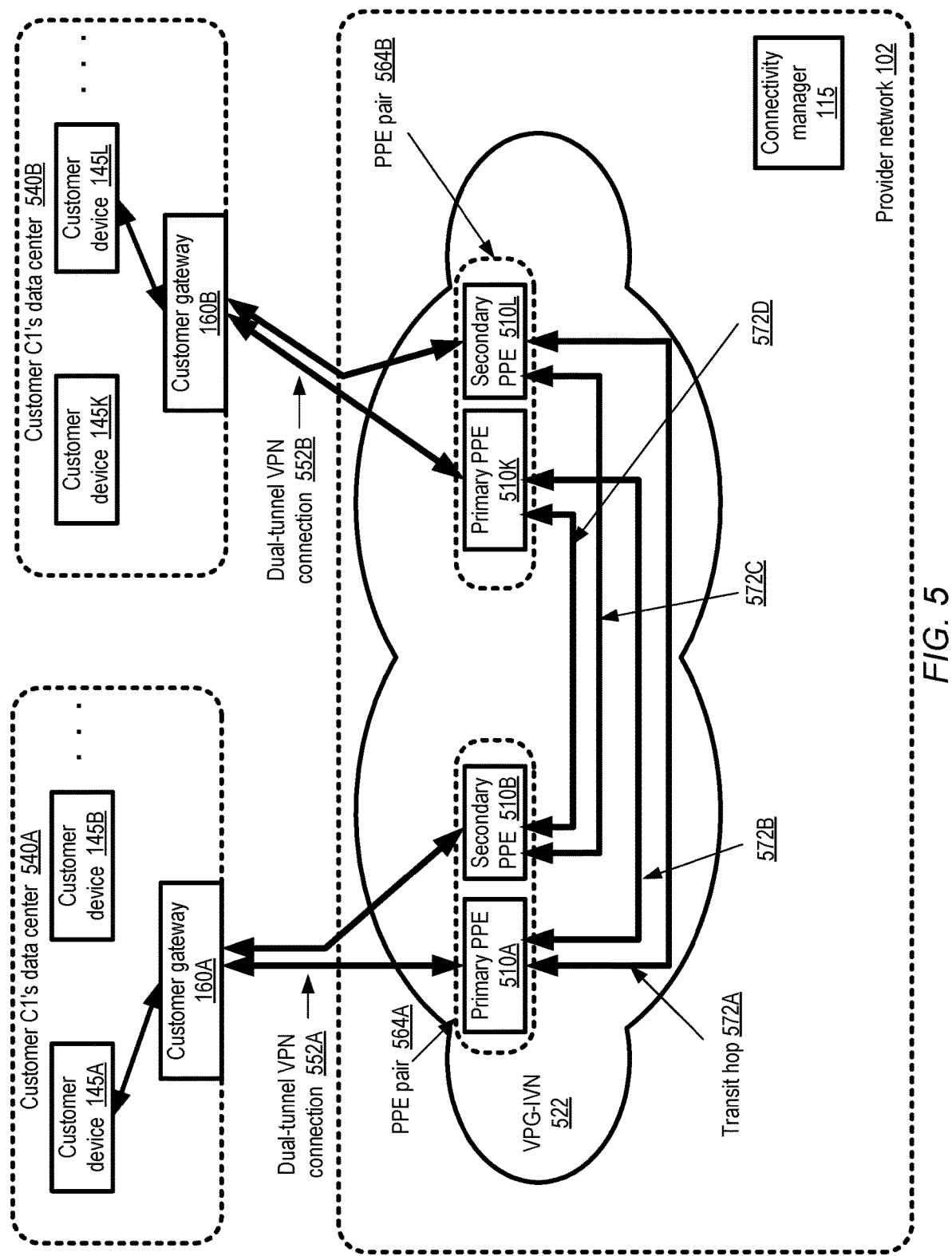
FIG. 5 illustrates an example of a hub-and-spoke connectivity configuration utilizing an intermediary IVN for two data centers of a customer, according to at least some embodiments.

In some cases, customers may wish to utilize the provider network resources for secure connectivity between different data centers, instead of or in addition to establishing secure connectivity between the data centers and the customer's IVNs. A VPG comprising PPEs may serve as a hub of a hub-and-spoke configuration in such scenarios, with respective VPN connections to the data centers as the spokes of the configuration. FIG. 5 illustrates an example of a hub-and-spoke connectivity configuration utilizing an intermediary IVN 522 for two data centers 540A and 540B of a customer, according to at least some embodiments. In the depicted embodiment, one pair 564A of PPEs (510A and 510B) may be used for communications between the VPG-IVN 522 and the first customer data center 540A, and a second pair 564B of PPEs (510K and 510L) may be used for communications between the VPG-IVN 522 and the second customer data center 540B. In some embodiments, an API specifically for the establishment of VPNs between customer data centers may be supported by connectivity manager 115 (e.g., as distinct from an API for establishing VPNs between customer data centers and customer IVNs).

In the depicted embodiment, as in the earlier examples shown in FIGS. 1 and 4, one PPE of each pair 564 may be designated as the primary/active PPE for the corresponding dual-tunnel VPN connection 552. PPEs 510A and 510B are selected as the respective primaries of pairs 564A and 564B. In routing tables used for communications from either one of the PPE pairs to other locations within VPG-IVN 522, the primary PPE of the other pair may be selected as the next hop. After an encrypted packet (whose contents were originally generated at customer device 145A and destined for customer device 145L) is received and decrypted at PPE 510A in the depicted embodiment, for example, the packet may be transmitted over transit hop 572B to PPE 510K. At PPE 510K, the packet may be encrypted and sent to the customer gateway 160B on its way to the destination customer device 145L. In some embodiments, several of the transit hops (e.g., 572A, 572B, 572C and/or 572D) between the PPEs of pairs 564A and 564B may be used in parallel for customer data traffic between the data centers 540A and 540B.

In the configurations described thus far, at least some of the traffic between the customer data centers and the provider network may travel over shared physical network links, e.g., links that form part of the public Internet may be used for the VPN traffic in some embodiments. For certain types of applications, some customers may wish to use dedicated physical links, such that only a single customer's traffic to/from the provider network flows via the dedicated links. In at least some embodiments, the provider network may enable the establishment of such dedicated physical links, e.g., between a customer router and a co-located provider network router. Such dedicated physical links may be referred to in some environments as "direct connect" links. A number of options regarding bandwidth limits on the dedicated physical links (and corresponding pricing policies) may be supported by the provider network in some embodiments. For example, in one embodiment, the provider network may support 1 Gigabit/second direct links and 10 Gigabit/sec direct links, from which the customer may programmatically select the type of direct connection they wish to utilize depending on their expected traffic needs and budgets. Such dedicated links may provide another mechanism for secure, high-throughput connectivity between customer data centers and customer instances, as well as between different customer data centers.

Figure 6:
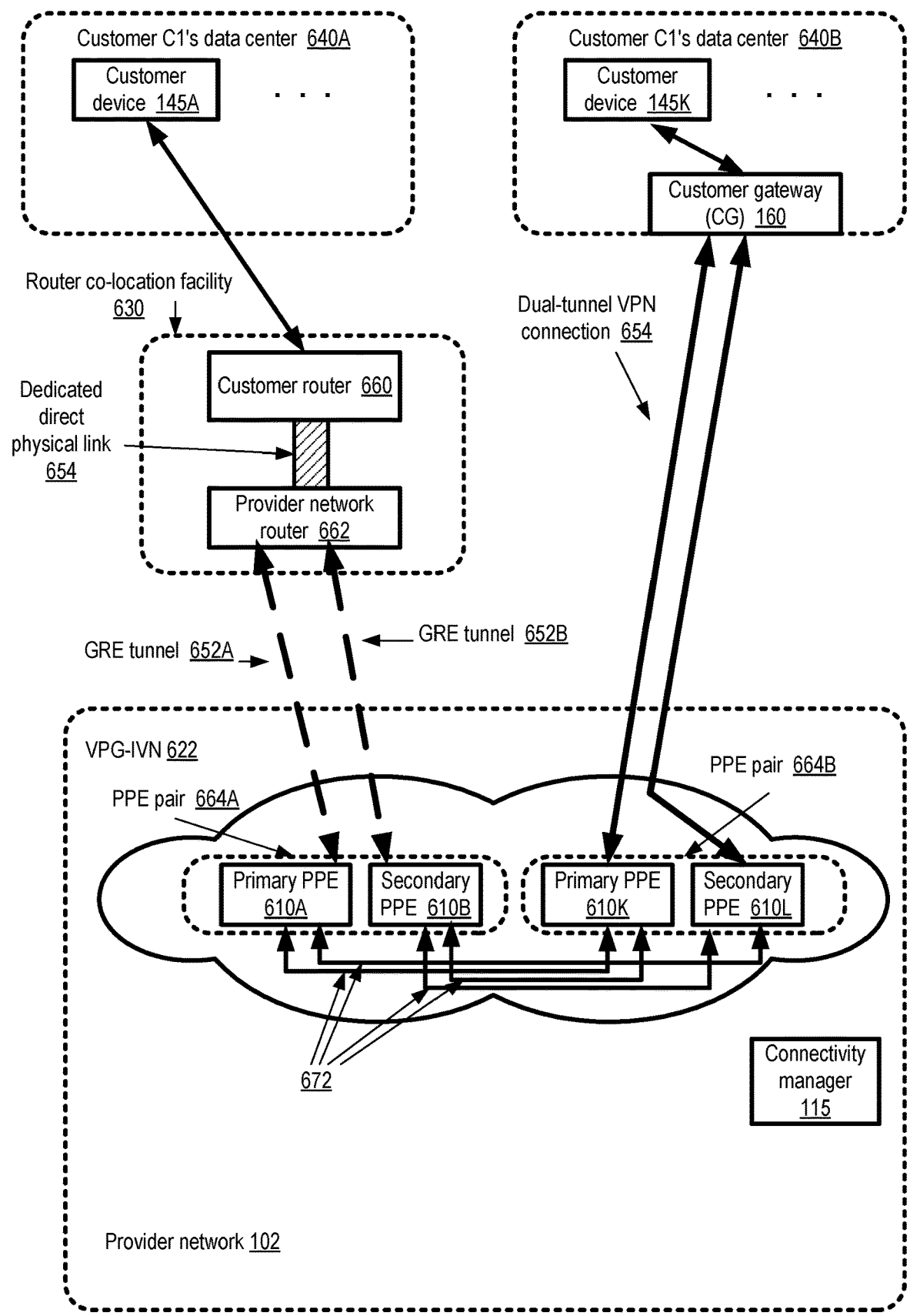
FIG. 6 illustrates an example of a configuration in which an IVN with a VPG may be used for connectivity between two customer data centers, where one of the customer data centers is linked to the provider network via a dedicated physical link at a router co-location facility, according to at least some embodiments.

FIG. 6 illustrates an example of a configuration in which an IVN with a VPG may be used for connectivity between two customer data centers 640A and 640B, where one of the customer data centers (640A) is linked to the provider network via a dedicated physical link at a router co-location facility, according to at least some embodiments. As shown, router co-location facility 630 includes a customer router 660 and a provider network router 662. A dedicated physical link 654, to be used exclusively for customer C1's traffic, connects the two routers 660 and 662. If customer C1 wishes to transmit at least some of the traffic originating at data center 640A to a second data center 640B via the direct link 654, a VPG-IVN 622 may be established in the depicted embodiment. One pair 652A of PPEs (610A and 610B) may be set up for encapsulated traffic between the provider network and data center 640A, and another pair 652B of PPEs (610K and 610L) may be set up for traffic between the provider network and data center 640B. In the depicted embodiment, the GRE (Generic Routing Encapsulation) protocol may be used for encapsulating packets at the provider network router 662, while IPSec may be used for the VPN connection 654 between the PPE pair 664B and the data center 640B. Other protocols may be used in other embodiments. In effect, a bridge may be established using GRE tunnels between the directly-linked pathway and the VPN connection pathway in the depicted embodiment, enabling a conceptually similar flow of traffic between the data centers 640A and 640B as was discussed with respect to data centers 540A and 540B of FIG. 5. Any combination of the transit hops 672 may be used for traffic between customer data centers 640A and 640B in the embodiment shown in FIG. 6, e.g., based on route settings determined by the routing service of the provider network.

It is noted that a single virtual private gateway (with some selected number of PPEs configured) may be used to establish connectivity between different types of network endpoints in some embodiments, using several of the approaches illustrated in FIG. 1, FIG. 4, FIG. 5 and FIG. 6 concurrently. Thus, for example, the same customer may want to establish VPNs between customer data centers and one or more IVNs, between pairs of data centers, and between data centers that use direct physical links and those that do not. All these types of connections may be implemented in some embodiments using a single virtual private gateway with the appropriate number of PPEs configured. In some embodiments, customers may select different levels of availability for different VPN connections, in which case the number of PPES used may differ from one VPN to another.

Dynamic Selection of Instance Types for PPEs

Figure 7:
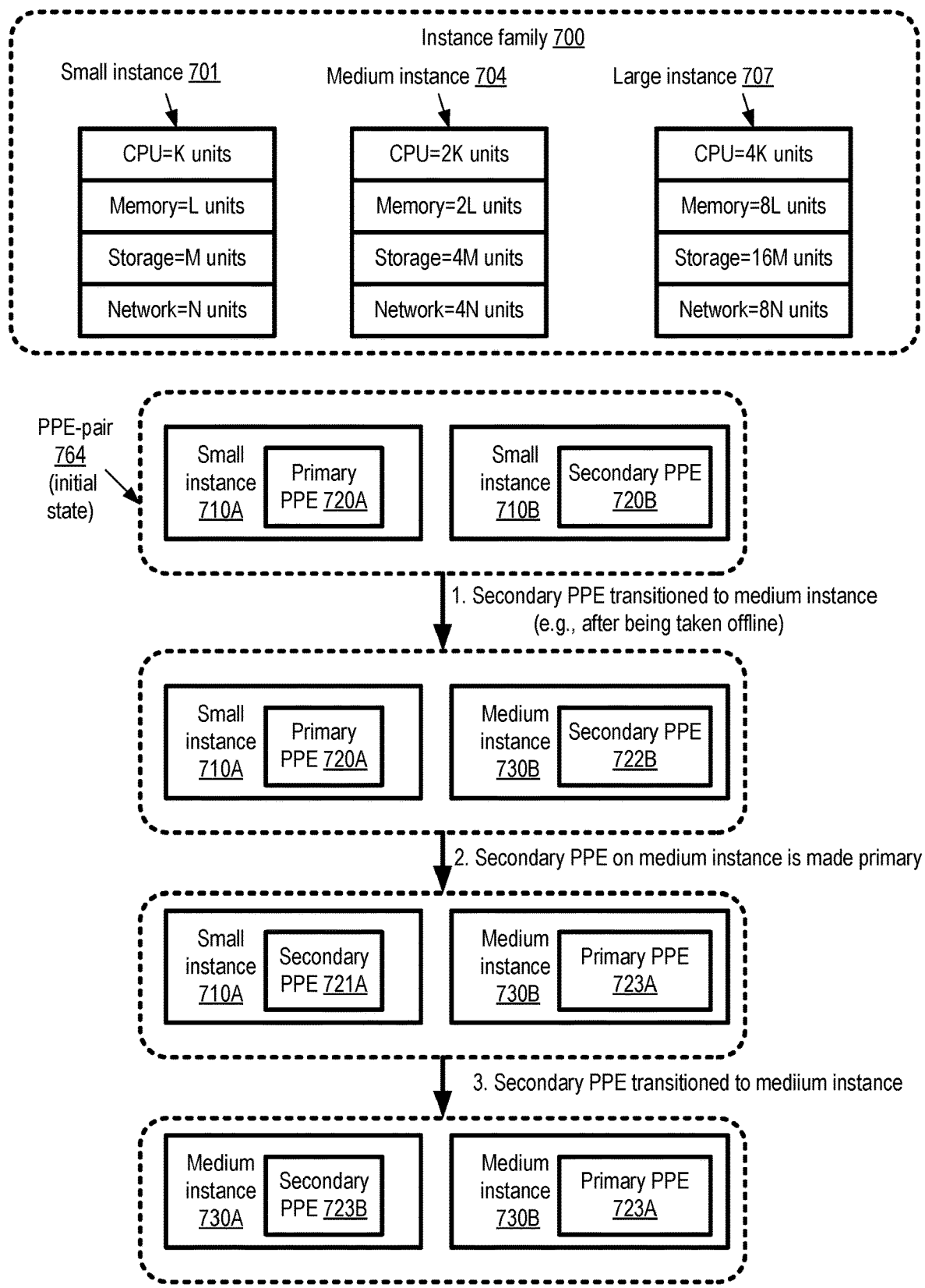
FIG. 7 illustrates examples of compute instance types that may be employed for PPEs, according to at least some embodiments.

FIG. 7 illustrates examples of compute instance types that may be employed for PPEs, according to at least some embodiments. The virtual computing service of the provider network may allow the selection of different types of compute instances from an instance "family" 700 of pre-defined types in the depicted embodiment. Instance family 700 may comprise small instances 701, medium instances 704, and large instances 707, with different capacities for the different instance types with respect to computing power, memory, storage and networking. In the examples shown, the computing capability (which may be expressed in units selected by the provider network operator) of medium instances is twice that of small instances, while the computing capability of large instances is twice that of medium instances. The ratio of the available memory between small, medium and large instances is 1:2:8, the ratio for storage is 1:4:16, and the ratio for network bandwidth is 1:4:8. Instance types with different capacity ratios than those shown in FIG. 7 may be supported in different embodiments.

In some embodiments, the connectivity manager 115 or other control-plane components of the provider network may monitor resource utilizations at the compute instances used for the PPEs, and may select the appropriate instance types to be used initially for a given VPN connection on the basis of resource utilization metrics collected over time. For example, for PPE-pair 764 of FIG. 7 established for a given VPN customer C1, both the primary PPE 720A and the secondary PPE 720B may initially be executed using respective small instances 710A and 710B. If the workload associated with C1's VPN grows beyond some threshold, a decision may be made to move up to a more powerful set of instances, e.g., a transition from small to medium instances may be implemented. In some embodiments, such a transition may be coordinated by the connection manager 115, for example, or such a transition may be managed by the health monitoring service.

In the embodiment shown in FIG. 7, the transition from using small instances to medium instances may be performed in several stages. First, as indicated by the arrow labeled "1", the secondary PPE may be moved from small instance 710B to a medium instance 730B. In some implementations, the secondary PPE may have to be taken offline briefly for the transition (e.g., to shut down the secondary PPE process, apply the necessary network configuration changes, and start a replacement process), while in other implementations live migration of the secondary PPE may be implemented. The transitioned secondary PPE at medium instance 730B is labeled 722B in FIG. 7. Next, as indicated by the arrow labeled "2", the roles of primary and secondary may be switched, transforming the previous primary PPE into secondary PPE 721A, and the previous secondary 722B to primary 723A. Finally, as indicated by the arrow labeled "3", the secondary PPE may be transitioned to a medium instance 730A using a procedure similar to that discussed for the transition labeled "1". In other embodiments, a different approach may be taken to transitions between instance types—e.g., both PPEs may be live migrated to a different instance in parallel, or both may be taken offline briefly, or a substitute PPE pair may be established for the transition period and then freed after the PPEs have been launched at the appropriately-sized instances. In at least one embodiment, a PPE may be transitioned to a smaller instance type if its workload remains below some threshold level for a sustained time period.

PPEs at Multi-Tenant Instance Hosts

For a variety of reasons, instance hosts may often be used in a single-tenant mode to implement PPEs—e.g., only one compute instance may be launched on the instance host, and that compute instance may be used for a single PPE. Such a single-tenant approach may help reduce the probability of security breaches, and the probability of impacting performance of one VPN connection due to another, for example. However, the single tenant approach may sometimes lead to less-than-optimal levels of resource utilization at the instance host. For example, it may typically be possible to launch several small instances on a given instance host, and using such a host for just one small instance may not be considered ideal. Accordingly, in at least some embodiments, PPEs may be set up on instance hosts in a multi-tenant mode.

Figure 8A:
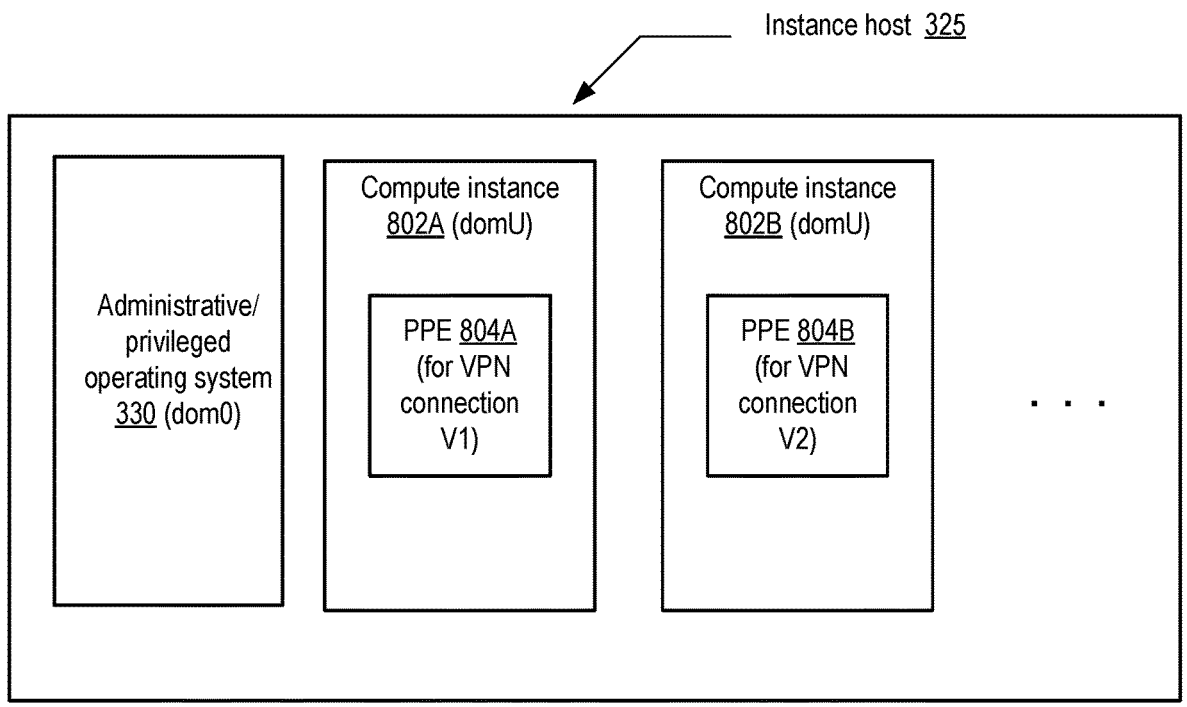
FIGS. 8a and 8b illustrate examples of configurations in which a single instance host may be used in a multi-tenant environment for PPEs, according to at least some embodiments.
Figure 8B:
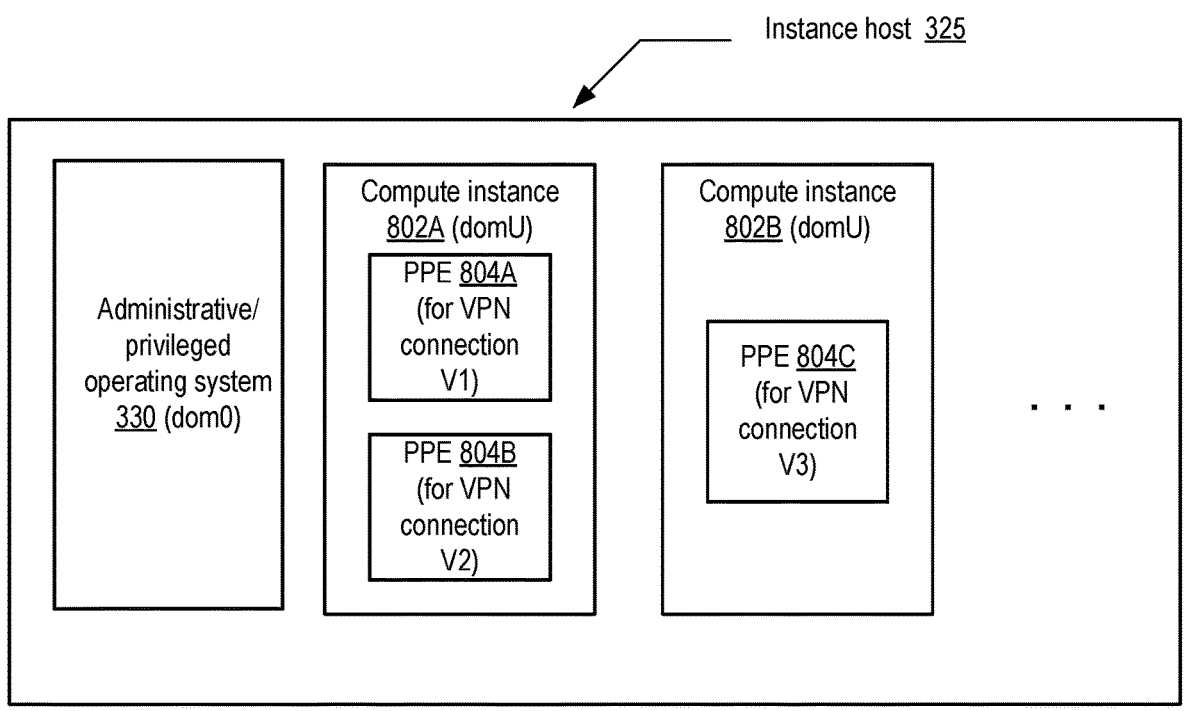

FIGS. 8a and 8b illustrate examples of configurations in which an instance host may be used in a multi-tenant environment for PPEs, according to at least some embodiments. In FIG. 8a, PPE 804A for one VPN connection V1 is implemented at a first instance 802A at an instance host 325, while PPE 804B for a different VPN connection V2 is implemented at a second instance 802B. VPN connections V1 and V2 may be established on behalf of the same customer in the depicted embodiment. In FIG. 8b, a single compute instance 802A at instance host 325 comprises a plurality of PPEs 804A (for VPN connection V1) and 804B for (VPN connection V2), while another PPE 804C is implemented at instance 802B for a third VPN connection V3. In some embodiments in which instance hosts are being used for PPEs of different VPN connections, the connection manager may try to ensure that different PPEs of the same VPN connection are not co-located within the same instance, e.g., so that a failure of a single instance does not result in both PPEs of a PPE-pair becoming unavailable. In some embodiments, in a different approach to multi-tenancy, a single instance may be used for PPEs configured for two different VPGs. According to one embodiment, customers may be given the option of indicating their preference for multi-tenancy versus single-tenancy with respect to PPE configurations. The pricing policies applicable to multi-tenant configurations may be different than those applied to single-tenant configurations—e.g., VPN connectivity implemented using multi-tenant hosts may cost less than VPN connectivity via single-tenant hosts. In one embodiment, a customer may be able to programmatically indicate a desired availability level or range for one or more VPN connections, and the connectivity manager may use the indicated availability preferences to determine whether single-tenancy or multi-tenancy should be used for the customer.

Methods of Providing VPN Connectivity Using Instance-Based VPGs

Figure 9:
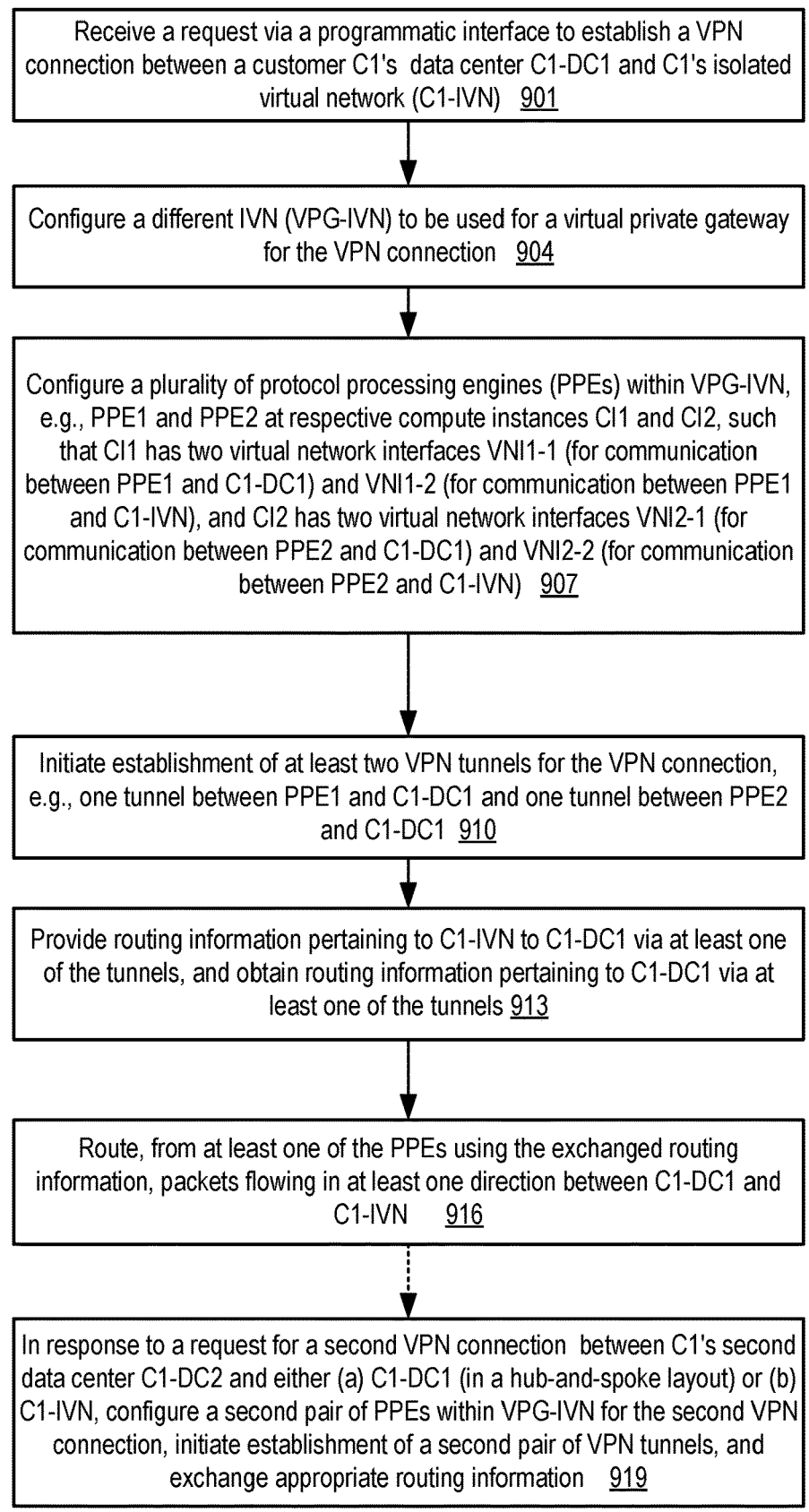
FIG. 9 is a flow diagram illustrating aspects of operations that may be performed to implement VPN connectivity between a customer data center and the customer's IVN, according to at least some embodiments.

FIG. 9 is a flow diagram illustrating aspects of operations that may be performed to implement VPN connectivity between a customer data center and the customer's IVN, according to at least some embodiments. A connectivity service of a provider network (e.g., a service responsible for implementing VPNs, connections via direct dedicated physical links similar to link 654 of FIG. 6, and the like) may define and expose a set of programmatic interfaces for connectivity establishment and configuration. As shown in element 901, a request may be received (e.g., at a connectivity manager 115 of the service) via one such interface from a client C1, requesting the establishment of a VPN connection between C1's data center (C1-DC) and C1's IVN (C1-IVN) within the provider network.

The connectivity manager may attempt to determine whether a VPG (virtual private gateway) has already been established for connectivity to C1-IVN, e.g., in response to an earlier VPN connection request for some other data center of C1. The connectivity service may have a configuration database that can be searched by customer, by IVN, or based on other query parameters, for example. If no such pre-existing VPG is found, a new VPG may be established. A new IVN may be configured specifically for the VPG by the connectivity manager (element 904), and a selected number of PPEs may be instantiated at one or more compute instances within the newly configured VPG-IVN (element 907). The number of PPEs created, the mappings of the PPEs to instances, and the types/sizes of the instances may vary from one implementation to another. In the depicted embodiment, each PPE may have a pair of virtual network interfaces (VNIs) configured, with one VNI of the pair to be used for encrypted traffic between the customer data center and the PPE and the other VNI to be used for decrypted traffic between the PPE and C1-IVN.

At least a pair of VPN tunnels may be established, one between a first PPE of the VPG and the customer data center, and the second between a second PPE of the VPG and the customer data center (element 910). The procedure for establishment of the tunnels may vary, depending on the specific VPN protocol being used—for example, in an embodiment in which IKE and IPSec are being used, keys and IP addresses may programmatically be provided for a customer gateway at the customer data center. After the tunnels have been set up, routing information may be exchanged in both directions (element 913). For example, routing information pertaining to C1-IVN may be sent to the customer gateway via one or both tunnels, and routing information pertaining to the customer data center may be received from the customer gateway at one or both the PPEs via the tunnels. Using the routing information, customer C1's data packets may be transmitted in either direction along the VPN pathway (element 916). For example, packets originating at a customer device within C1-DC1 may be encrypted at the customer gateway, sent in encrypted form to one of the PPEs, decrypted at the PPE and sent via an internal pathway within the provider network to a destination customer instance within C1-IVN. Similarly, packets generated at a customer instance within C1-IVN may be sent in plain text to a selected PPE of the VPG, encrypted at the PPE, and sent to the customer gateway at C1-DC for decryption on its way to a targeted customer device at C1-DC. In at least some embodiments, a particular VPG set up for C1 may enable connectivity in a number of different endpoint configurations, e.g., with respective PPE pairs being configured for each group of destinations to be connected, as indicated in element 919 of FIG. 6. For example, a single VPG may be used for connectivity between C1-IVN and a plurality of different data centers in one embodiment, e.g., by establishing at least another pair of PPEs within the VPG-IVN for each additional data center to which a VPN connection is desired. Hub-and-spoke VPN connectivity of the kind illustrated in FIG. 5 and in FIG. 6 may also be implemented using PPEs and the exchange of the appropriate routing information for the desired types of end-to-end data transfers.

In at least some embodiments in which pairs of PPEs are established for connectivity between a customer data center and some other destination group such as C1-IVN, one of the PPEs of the pair may be selected as the primary or active PPE (e.g., by a routing service as described below), while the other PPE may be designated as a secondary or backup PPE. In some implementations, multiple secondary or backup PPEs may be established. In the event of a failure at the primary, a secondary PPE may be selected to take over as the primary, e.g., by a health monitoring service as described below in further detail. In some embodiments, the connectivity service may collect and analyze various metrics obtained from the PPEs and/or the VPN network paths, and may reconfigure various entities involved in the VPN connections as needed. For example, the types of compute instances being used for the PPEs for a given customer may be changed over time in response to changes in VPN traffic patterns—e.g., more performant instance types may be configured in response to sustained increases in workloads, or less powerful instance types may be used if workload levels remain low over long periods.

Health Monitoring Service

At least some of the services implemented at a provider network may be targeted to support extremely high levels of availability and data durability, e.g., via any of several forms of data replication and/or functional redundancy. In some embodiments, as described above, VPN connections may be implemented using pairs of tunnels, in which at a given point in time one of the tunnels and the corresponding PPE are designated as primary or active, while the other tunnel and PPE are designated as secondary or passive. In some such embodiments, as also indicated earlier, role transitions from secondary PPE to primary PPE (and from primary to secondary) may be initiated by a health monitoring service (HMS) that analyses health metrics from a variety of sources in several modes or stages, and takes different types of actions based on the results of each mode of analysis. The HMS may not be restricted to monitoring health status of connectivity-related resource such as PPEs or routing service nodes in some embodiments. Instead, the HMS may be designed and implemented for more general use, and may be employed for monitoring resources or nodes of a variety of network-accessible services of the provider network, including for example at least a subset of the compute instances of the provider network's virtual computing service. In some embodiments, a set of programmatic interfaces (e.g., APIs, web portals, command-line tools and the like) may be implemented to enable configuration of the health monitoring service itself. The interface(s) may enable users of the HMS (e.g., administrators of other services of the provider network) to specify, for example, any of the following: (a) the types of resources to be monitored, (b) the specific health metric source to be used, (c) the subsets of health metrics to be examined in the first analysis, (d) the health metrics to be examined in subsequent analysis phases, (e) the probability thresholds used to initiate actions at each of the analysis stages.

Figure 10:
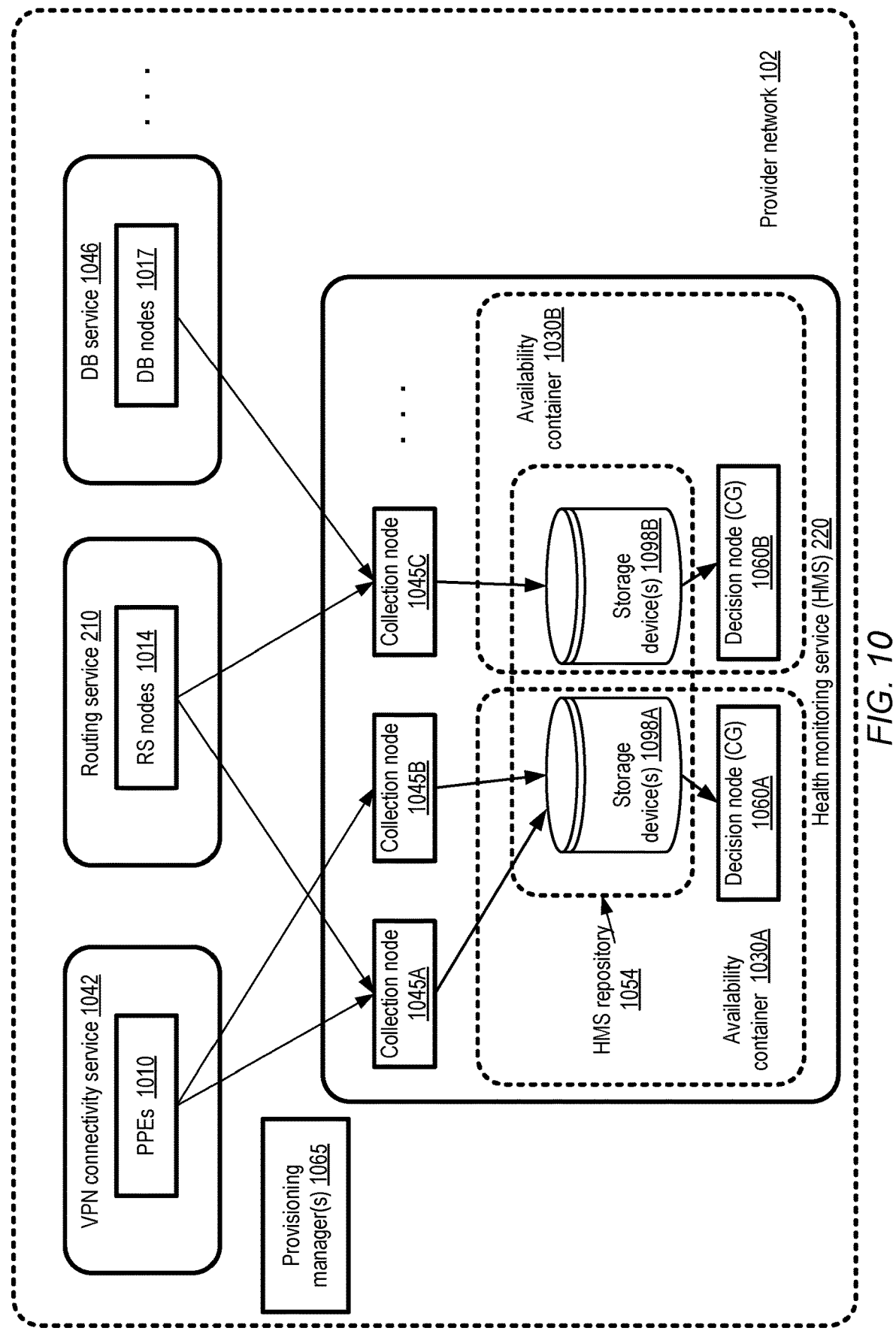
FIG. 10 illustrates an example system environment in which a multi-mode health management service (HMS) may be implemented at a provider network, according to at least some embodiments.

FIG. 10 illustrates an example system environment in which a multi-mode health management service (HMS) may be implemented at a provider network, according to at least some embodiments. In the depicted embodiment, three examples of network-accessible services that utilize an HMS 220 of a provider network 102 are shown: a VPN connectivity service 1042, a routing service 210, and a database service 1046. Each of the three depicted services may comprise a plurality of monitored nodes, from which collection nodes 1045 (e.g., 1045A, 1045B and 1045C) of the HMS 220 may obtain various types of health metrics. For example, health metrics relevant to VPN connections may be obtained from a plurality of PPEs 1010 distributed around the provider network, health metrics relevant to the routing service may be obtained from routing service nodes 1014, and health metrics relevant to the database service may be obtained from various database nodes 1017. Provisioning managers 1065 may be responsible for identifying the hardware/software components required for the service nodes in the depicted embodiment—e.g., control-plane components of the various services 1042, 210 or 1046 may request additional resources from the provisioning managers when additional service nodes have to be brought online.

The collection nodes 1045 may be responsible for storing the health metrics in a persistent repository 1054, which may include a plurality of storage devices 1098 such as 1098A and 1098B. A back-end or decision layer of the HMS 220, comprising some number of decision nodes such as 1060A and 1060B, may be responsible for analyzing the health metrics in at least two phases or modes of analysis: a first, relatively quick analysis to determine whether any immediate actions need to be taken, and a second, more detailed analysis to determine whether longer-term remediation actions are to be performed. The decision node layer of the HMS and the persistent repository 1054 may both be implemented in the depicted embodiment in a logically-centralized, physically-distributed manner to achieve desired levels of data durability, availability and resilience to failures of the HMS itself. Thus, for example, the collected health metrics pertaining to a particular monitored node or to a particular monitored service may be physically stored (and/or replicated) among a plurality of storage devices, but may be accessed and analyzed as though only one consolidated copy of the metrics were available. Similarly, a given responsive action taken at the decision layer may appear to be initiated from a single authoritative deciding entity, even though multiple decision nodes at different locations within the provider network may be able to access the metrics used for determining the responsive action.

In at least some embodiments the provider network 102 may be organized into a plurality of geographical regions, and each region may include one or more availability containers (such as availability containers 1030A and 1030B of FIG. 10). Availability containers 1030 may also be termed "availability zones" herein. An availability container in turn may comprise one or more distinct locations or data centers, engineered in such a way (e.g., with independent infrastructure components such as power-related equipment, cooling equipment, and physical security components) that the resources in a given availability container are insulated from failures in other availability containers. A failure in one availability container may not be expected to result in a failure in any other availability container; thus, the availability profile of a resource is intended to be independent of the availability profile of resources in a different availability container. Various types of applications and services may be protected from failures at a single location by launching multiple application instances in respective availability containers. In some implementations, a single IVN (such as a customer IVN or a VPG-IVN) may span multiple availability containers 1030. In the depicted embodiment, decision nodes 1060 and storage devices 1098 of the HMS may be distributed across several different availability containers, e.g., in accordance with the availability/uptime goals of the HMS itself. Nodes of the various services whose health is monitored by the HMS may also be distributed among different availability containers 1030 in at least some embodiments. In at least one implementation in which different subsets of the monitored service nodes (e.g., PPEs 1042) are located within different availability containers 1030, respective sets of collection nodes may also be located within the same availability container as the monitored nodes. In at least one embodiment, the collection nodes may be largely or wholly stateless, with the primary responsibility of saving collected health metrics as quickly as possible in persistent HMS repository 1054. As such, a failure of a given collection node 1045 may not require a substantial recovery effort; instead, a replacement collection node may simply be activated, e.g., by instantiating a new process or compute instance and modifying the necessary network configuration settings. In some embodiments, the HMS may monitor itself—e.g., some sets of collection nodes may be responsible for gathering metrics on other sets of collection nodes and decision nodes, and some set of decision nodes may be responsible for analyzing the health metrics collected from the HMS nodes and taking responsive actions.

According to at least one embodiment, several different types of health metrics pertaining to nodes of other services may be collected by the HMS. The metrics may include, among others, (a) respective self-health-check metrics of one or more subcomponents of a monitored resource such as a PPE, (b) responses to programmatic status queries directed to a host at which a monitored resource is implemented, (c) peer health status reports from at least one peer resource of a monitored resource, and (d) protocol verification metrics obtained using at least one network pathway established to emulate interactions of a monitored resource with a client of a service being implemented at the monitored resource. The mappings between collection nodes 1045 and monitored service nodes such as PPEs 1010, RS nodes 1013 or DB nodes 1017 may vary in different embodiments. For example, in one embodiment, a given collection node may be responsible only for collecting metrics pertaining to one monitored service, while in other embodiments, a given collection node may collect metrics pertaining to a plurality of monitored services. In some embodiments, a given collection node may collect metrics of a plurality of monitored nodes, while in other embodiments, a separate collection node may be established for each monitored node. The mode of transmission of the health metrics to the collection nodes may also differ in various embodiments and/or for different types of metrics. For example, a "pull" mode may be employed in some cases, in accordance with which the collection node retrieves health metrics; a "push" mode may be employed in other cases in which the monitored node sends a stream of health metrics to the collection nodes without being prompted for each metric separately; and both push and pull mode may be used in yet other scenarios. The collection nodes may save the metrics to repository 1054 as soon as they are received in some embodiments, e.g., without performing analysis of the metrics.

After health metrics are stored at the repository, decision nodes 1060 may perform a multi-stage analysis of the metrics in the depicted embodiment. In a first stage of analysis of the metrics pertaining to a given monitored node that have been collected over a particular time period, the probability that the monitored resource is in an unhealthy state may be estimated. In response to a determination, at a decision node 1060, based on such a first analysis, that a probability that the monitored resource is in an unhealthy state is above a threshold, a rapid-response mitigation action may be initiated in some embodiments. Different types of rapid-response actions may be taken for different types of monitored nodes. In one embodiment, for example, at least a subset of the workload of the monitored resource may be directed or diverted to a different resource—e.g., by initiating one or more changes to route table entries or by advertising a different IP address, the role of primary PPE may be granted to what used to be the secondary PPE of a PPE pair set up for a VPN connection. In one implementation, the HMS may send a request to a routing service 210 to divert workload away from the monitored resource that is suspected of being in an unhealthy state, and the routing service may perform the necessary route advertisements and/or changes to route table entries. In some implementations, settings at a load balancer configured for the monitored service may be changed such that the load balancer no longer directs workload requests to the monitored resource.

After the rapid-response mitigation action is initiated for a particular monitored resource, a second level analysis may be initiated for that monitored resource. This second level of analysis, which may be referred to as a remediation analysis, may differ in any of several respects from the first stage of analysis with respect to the data set being examined. For example, metrics from more data sources may be used, new data sources may be activated that were not employed for data collection for the first analysis, tests that were not executed as part of the first analysis may be run, more detailed statistical analysis may be performed and/or metrics collected over a longer time period may be analyzed. In some cases, a more precise or more reliable estimate of the probability that the monitored resource has reached an unhealthy state may be obtained. The results of the second-level analysis may be used to determine whether a longer-term remediation action pertaining to the monitored resource is to be initiated. Such a longer-term remediation action may, for example, involve sending a request to a service node provisioning manager 1065 to obtain a permanent hardware and/or software replacement for the monitored resource. If, for example, the first analysis had led to an estimation that the probability of failure at a given PPE was 0.6, and the second level analysis leads to an estimation (based on a larger source data set and more extensive statistical analysis) that the probability is 0.8, the remedial action may be undertaken. Other types of longer-term remediation actions may be taken in other embodiments—e.g., customer workload request rates may be throttled at least for some selected time periods so as to prevent future overload scenarios, pricing policy changes may be enacted to influence or redirect/divert service workloads, and so on. In at least some embodiments, machine learning techniques may be used to improve the effectiveness of one or both modes of analysis performed by the HMS.

Relative to some techniques that rely on a more limited set of health metrics (such as heartbeat messages alone) and analyses, the multi-modal approach of the HMS may help reduce both the number of false positives (cases where a service node such as a PPE is deemed to have failed when it actually remained functional) and the number of false negatives (cases where a service node was deemed to be functional but had actually failed) regarding service node failures. In addition, by rapidly failing away from a node suspected to have failed (e.g., as part of the rapid-response mitigation phase), the HMS may ensure that in those cases in which failures actually occur, there is minimal impact on customer workloads. The detailed analysis phase, which may typically be asynchronous with respect to the first analysis phase, may result in a more sound and complete determination of root causes of failures than may be possible under the constraints of production service level agreements. In at least some embodiment, the detailed analysis phase may be used to improve future initial analysis phases: e.g., in those cases where a false positive is identified via detailed analysis, the reasons why the false positive occurred may be investigated, and the techniques used during the initial analysis phase may be modified accordingly. As indicated earlier, in some embodiments a configuration API or tools may be exposed to enable various users (e.g., administrators of other services within the provider network) to configured the HMS itself—e.g., to specify a set of health metrics sources, define data collection protocols, define the contents of the first and subsequent phases of analysis, the types of actions to be undertaken in each phase, the probability thresholds to be used as triggers for actions, and so on.

Figure 11:
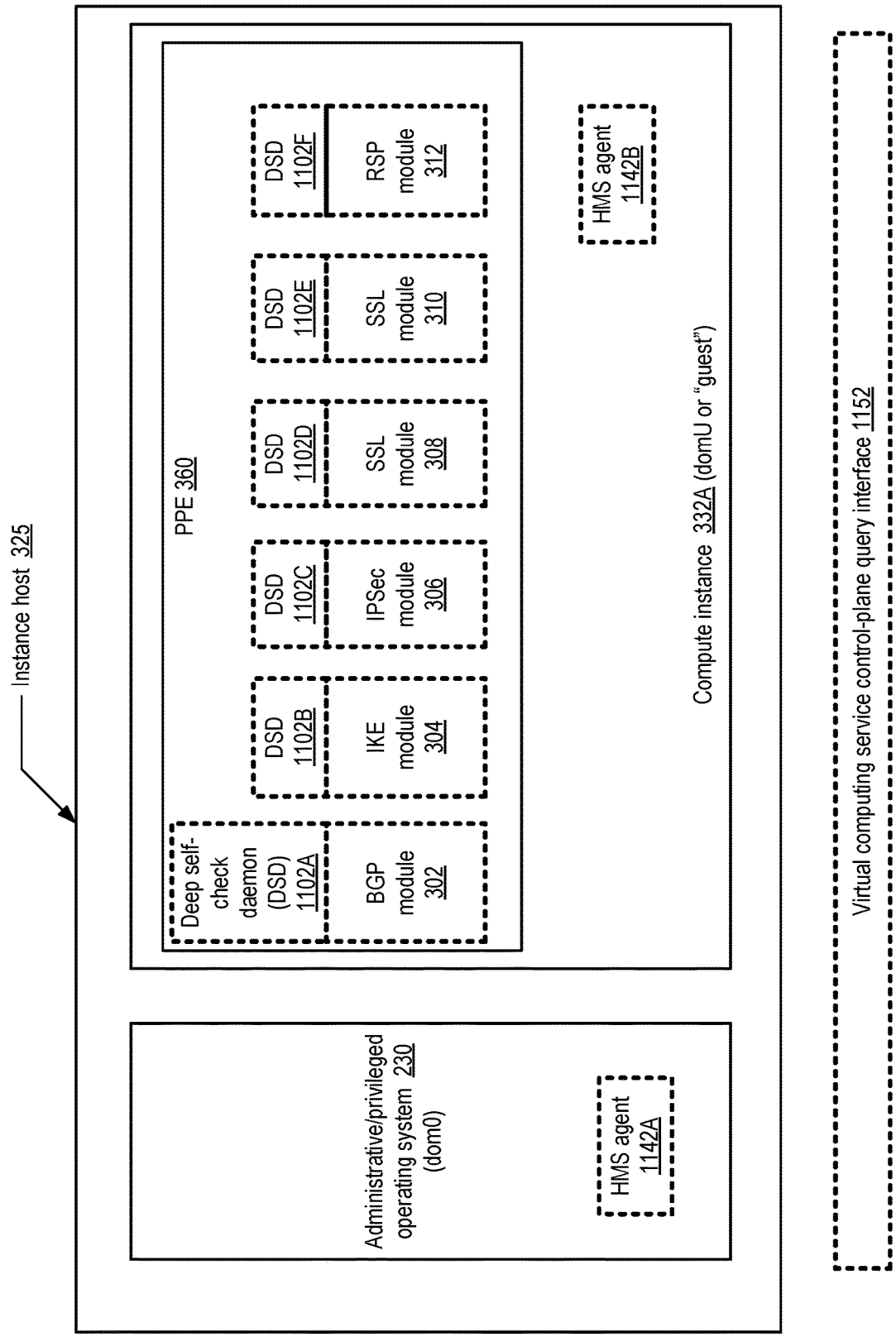
FIG. 11 illustrates a PPE that generates one or more self-check reports, and for which a control-plane interface of a virtual computing service may be used to obtain health status information for analysis by an HMS, according to at least some embodiments.

In some embodiments, as mentioned earlier, the health metrics obtained by the HMS may include results of self-health checks at monitored service nodes (such as PPEs) as well as responses to status query APIs. FIG. 11 illustrates a PPE that generates one or more self-check reports, and for which a control-plane interface of a virtual computing service may be used to obtain health status information for analysis by an HMS, according to at least some embodiments. As shown in FIG. 3, a PPE 360 may comprise a plurality of modules for implementing respective protocols in some embodiments. In the embodiment shown in FIG. 11, each of those PPE modules may have an associated deep self-check daemon (DSD) 1102 responsible for periodically verifying various aspects of the functionality of the module. Such self-checks may, for example, include invoking various APIs of the different modules from the daemon thread or process, comparing the results of the API invocations with an expected set of results, verifying the sizes and/or contents of buffers, checking whether any operations have remained outstanding or uncompleted for over a threshold time period, and so on. Respective DSDs 1102A-1102F may be configured for at least the BGP module 302, the IKE module 304, the IPSec module 306, the SSL module 308, the GRE module 310, and the RSP module 312 in the depicted embodiment. In one implementation, self-check results may be collected from the DSDs by an HMS agent 1142B (e.g., a process or thread dedicated to collecting locally available health metrics and transmitting them to the collection nodes of the HMS) instantiated at the compute instance 332.

In at least some embodiments in which compute instances of the virtual computing service are used for the PPEs, a control-plane query interface 1152 may be implemented by the virtual computing service. Using such an interface 1152, the current status of a given administrative operating system instance (dom0) or a specified compute instance may be obtained in some embodiments, e.g., by a collection node of the HMS. In one implementation, for example, such query APIs may include a "DescribeInstance" API, a "GetInstanceStatus" API, a "GetInstanceHostStatus" API, and the like. Responses to such APIs may indicate the state (from the perspective of the virtual computing service) of the targeted instance, dom0 instance, or the instance host as a whole. In some embodiments, an HMS agent 1142A may be started up within the dom0 and/or the hypervisor as well as at one or more instances, e.g., to gather local health metrics of the dom0 or the instance host. Since the PPE 360 may rely upon the functionality of the administrative components of the virtualization stack being used, identifying possible failures or faults at dom0 or at other components of the instance host may be key to taking the appropriate responsive actions by the HMS in at least some embodiments. The types of status discovery APIs and self-health-checking techniques illustrated in FIG. 11 in the context of PPEs of a connectivity service may also be used at other types of services in at least some embodiments—e.g., similar DSDs may be instantiated at database service nodes, routing service nodes, and so on.

Figure 12:
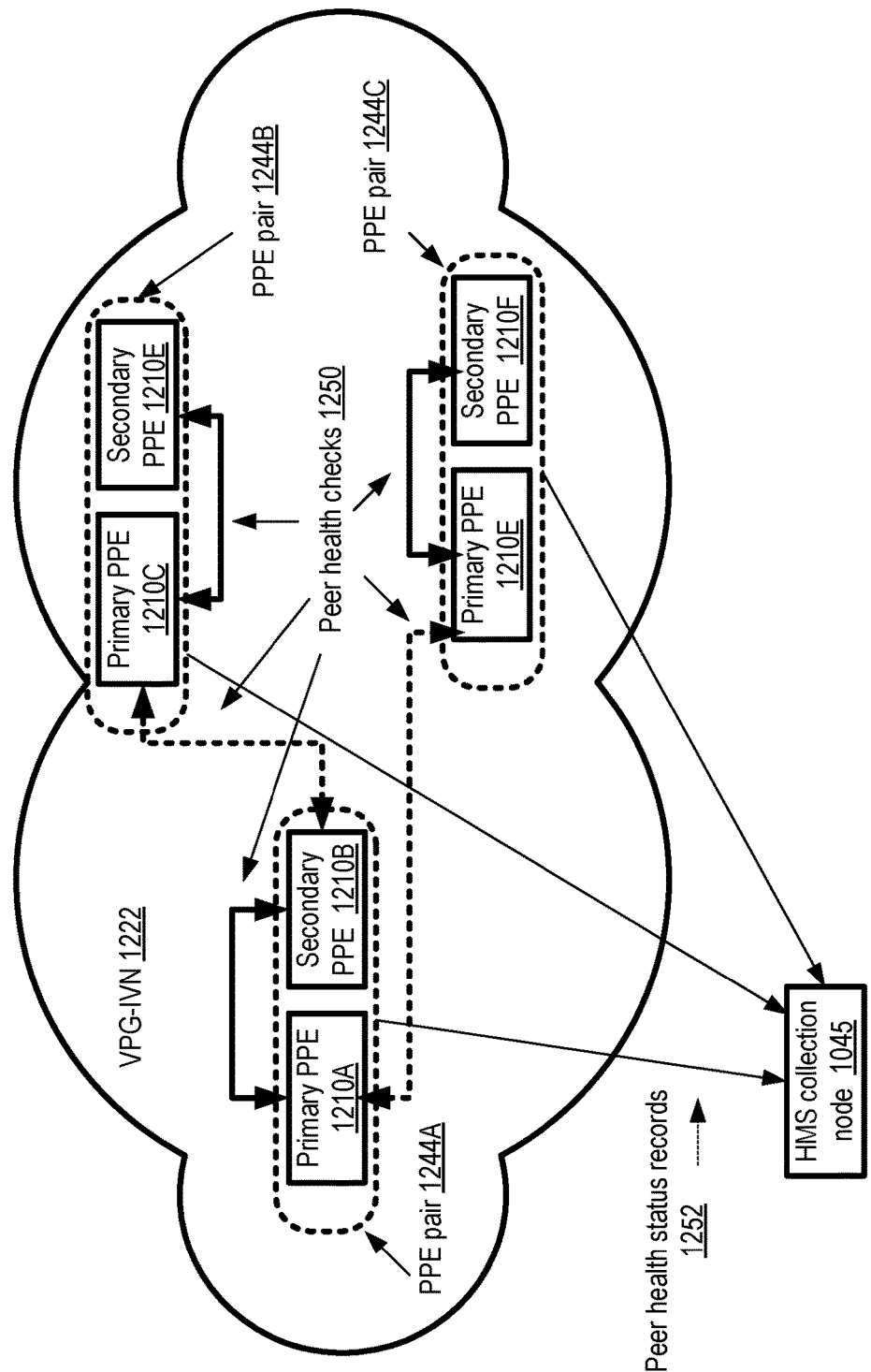
FIG. 12 illustrates examples of peer health checks that may be performed at an IVN used for a VPG and utilized by an HMS, according to at least some embodiments.

In some embodiments, service nodes that are affiliated in various ways with each other may also be configured to monitor each other's status and provide the HMS with the results of their monitoring. FIG. 12 illustrates examples of such peer health checks that may be performed at an IVN used for a VPG and utilized by an HMS, according to at least some embodiments. Three example PPE pairs within a particular VPG-IVN 1222 are shown: PPE pair 1244A comprising primary PPE 1210A and secondary PPE 1210B, PPE pair 1244B comprising primary PPE 1210C and secondary PPE 1210D, and PPE pair 1244C comprising primary PPE 1210E and secondary PPE 1210F.

At least two types of peer health checks 1250 may be implemented in the depicted embodiment: checks within a PPE pair (which may be referred to as intra-PPE-pair health checks), and checks between different PPE pairs (which may be referred to as inter-PPE-pair health checks). Intra-PPE-pair health checks, e.g., checks performed by PPE 1210A on PPE 1210B or by PPE 1210B on PPE 1210A, may in some embodiments be performed more frequently than inter-PPE-pair checks, such as checks performed by PPE 1210B on PPE 1210C. The peer health checks may, for example, comprise transmitting a query similar to a heartbeat message from a source PPE to a destination PPE, and measuring the time taken by the destination to respond. In some embodiments, the peer health check messages may be transmitted using packet-switched protocols such as the TCP/IP (Transmission Control Protocol/Internet Protocol) family, while in other embodiments custom protocols and/or special interconnects may be used. In some embodiments, the secondary PPE of a given pair may be responsible for the inter-PPE-pair health checks, thus reducing the health-check-related overhead on the primary PPE.

The peer health status records 1252 (i.e., results of the peer health checks) may be transmitted to HMS collection nodes 1045 in the depicted embodiment. In some cases, such records may be transmitted periodically (e.g., in batches rather than individually), unless an indication of unhealthy status is detected, in which case the records indicating the unhealthy status may be expedited. In at least one implementation, a particular PPE may be required to submit peer health status records it has collected at least once every N seconds regardless of whether an unhealthy peer was detected or not, where N may be a configurable parameter of the HMS. In one implementation, in order to reduce the amount of data transmitted to the HMS collection node, differential health check records may be transmitted, on which for example only the difference between one peer health check result and the previous health check result is provided to the HMS. Similar peer health checking and reporting techniques may be employed at other services than the VPN connectivity service (e.g., at the routing service and/or at a database service) in at least some embodiments.

Figure 13:
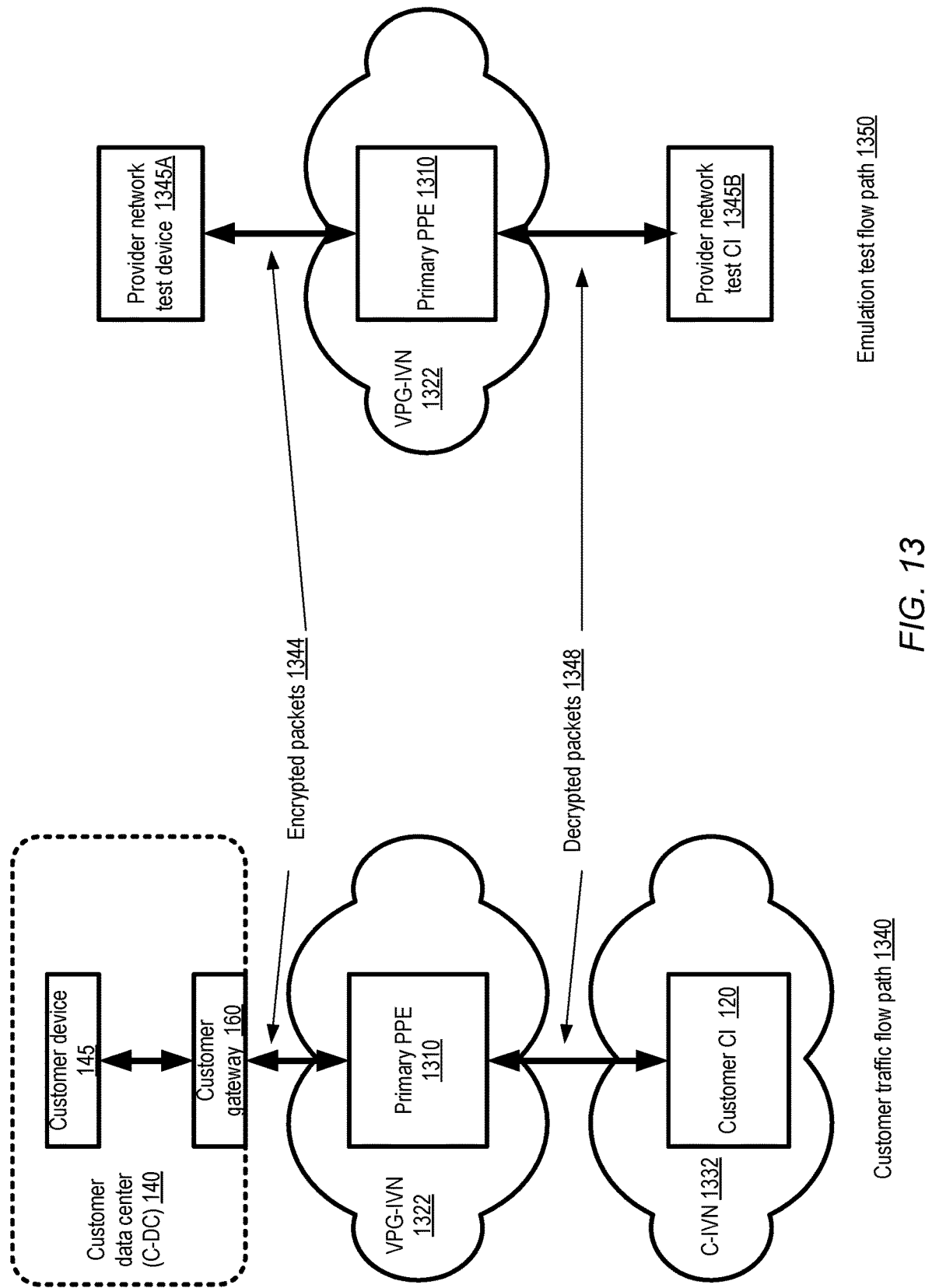
FIG. 13 illustrates an example of an emulated network path that may be used for analysis of a VPN connection by an HMS, according to at least some embodiments.

FIG. 13 illustrates an example of an emulated network path that may be used for analysis of a VPN connection by an HMS, according to at least some embodiments. A VPN customer's actual traffic may flow along the path 1340, and the HMS may emulate the customer's traffic flow using test devices 1345A and 1345B in the depicted embodiment to verify that at least some subset of the VPN functionality is working as desired. Along one direction of the customer's traffic flow path 1340, data packets generated at a customer device 145 at customer data center C-DC 140 may be encrypted by the customer gateway 160. The encrypted packets 1344 may then be transmitted over a VPN tunnel to a primary PPE 1310 of a virtual private gateway IVN 1322. The PPE 1310 may decrypt the packets and send the corresponding unencrypted packets 1348 to a customer instance 120 at C-IVN 1322. Along the other direction, unencrypted packets generated at customer CI 120 may be transmitted to the PPE 1310, and the encrypted versions of the packets may be sent via the tunnel to the customer gateway 160. The customer gateway may decrypt the packets and send them in unencrypted format to the customer device 145.

Although it may not be feasible to mimic network conditions of the customer data center fully, in the depicted embodiment the HMS may set up a logically similar network path to verify, for example, the encryption and decryption capabilities of the PPE 1310 and the speed with which the PPE is able to perform its protocol processing. For example, respective test devices 1345A and 1345B may be set up (e.g., at respective compute instances) to emulate the customer data center end and the customer IVN end of the VPN traffic flow. Packets encrypted in accordance with the VPN protocol(s) being used for customers may be transmitted from the test device 1345A to the PPE 1310, e.g., along a test VPN tunnel. The PPE 1310 may decrypt the packets and send them on to test device 1345B of the provider network. The test device 1345B may be able to verify (e.g., by comparing the contents of the decrypted packets with an expected set of contents) that the PPE is decrypting packets correctly. In addition, in at least some embodiments, timestamps may be inserted in the packets sent by test device 1345A, which can be used to gauge the performance of the VPN tunnel. Traffic may be sent in the reverse direction as well in some embodiments, and checked for functionality (i.e., whether the PPE's encryption feature is working as expected) and/or performance (how long the packets take to reach their destination). The results of the path emulation tests, at least some of which may be referred to herein as protocol verification metrics, may be provided to the collection nodes of the HMS, e.g., from the test device 1345A and/or 1345B. In at least one embodiment, a subset of the collection nodes may themselves participate in the emulation or protocol verification tests; e.g., the role of the test device 1345A or 1345B may be taken by an HMS collection node 1045. In some embodiments, the rate at which test traffic is transmitted over emulation test flow path 1350 may be varied, e.g., to obtain profiles of VPN performance as a function of workload levels, and such profiles may also be used during the detailed remediation analysis of the HMS. Similar path emulation techniques may be use at services other than the VPN connectivity service in at least some embodiments, such as at the routing service or a database service implemented at the provider network. In at least one embodiment, it may be possible to use test processes or daemons running on the same instance host as the customer CI 120 for the emulation testing, so that the tested pathways resemble the pathways end-user traffic even more closely.

Figure 14:
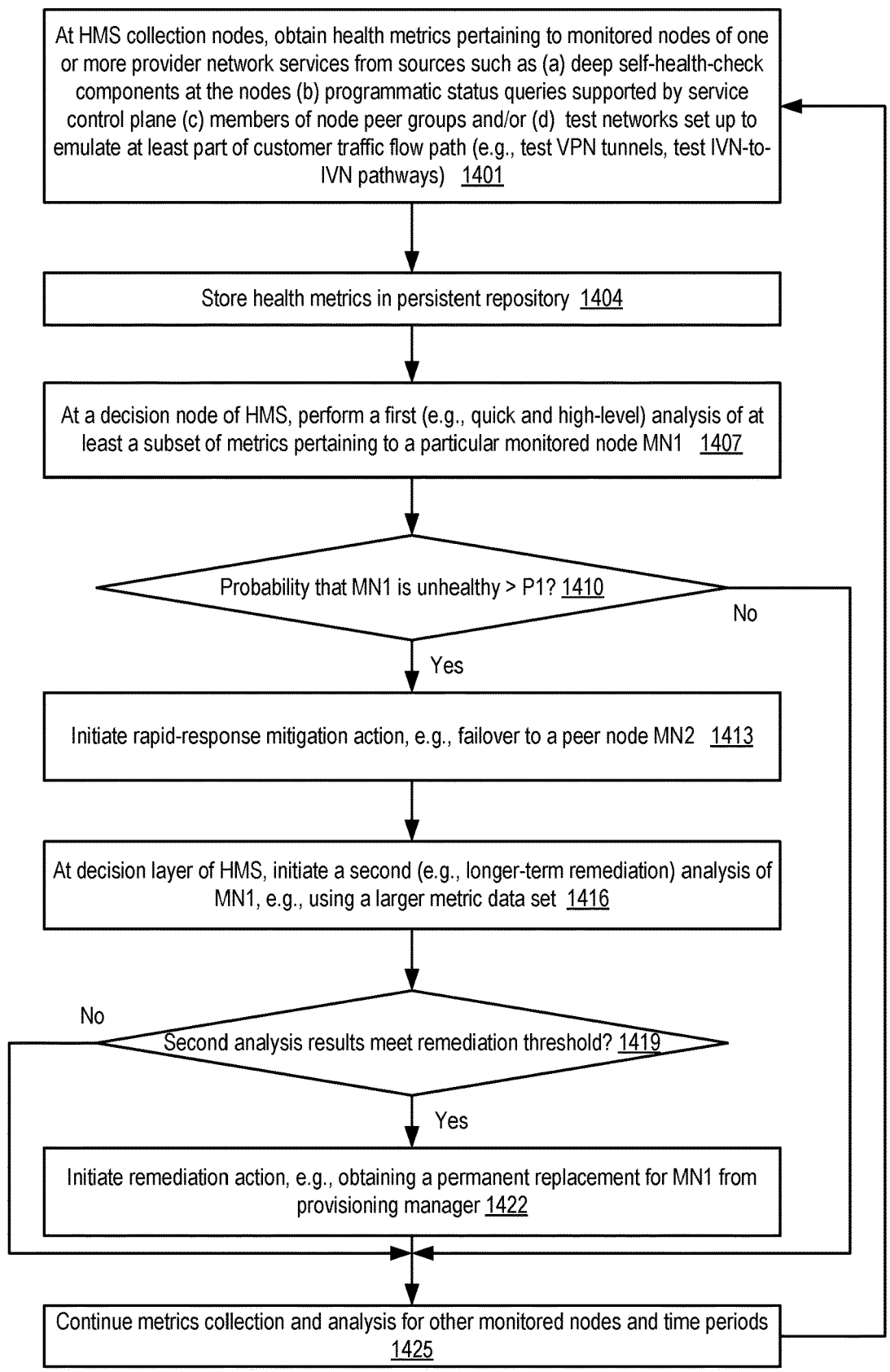
FIG. 14 is a flow diagram illustrating aspects of operations that may be performed to implement multi-phase health analysis by a health monitoring service, according to at least some embodiments.

FIG. 14 is a flow diagram illustrating aspects of operations that may be performed to implement multi-phase health analysis by a health monitoring service, according to at least some embodiments. As shown in element 1401, a variety of health metrics pertaining to monitored nodes of one or more provider network services may be obtained, e.g., at one or more collection nodes of an HMS. The metrics may be collected, for example, from sources such as (a) deep self-health-check components at the nodes (b) programmatic status queries supported by service control planes (c) members of node peer groups configured to perform peer health checks and/or (d) test network paths set up to emulate at least part of customer traffic flow path (e.g., test VPN tunnels, test IVN-to-IVN pathways and the like) and verify protocol processing operations. The collected health metrics may be stored at a persistent repository of the HMS (element 1404).

At least a subset of the set of metrics pertaining to a given monitored node MN1 may be examined in a first relatively quick and high-level analysis pass (element 1407), e.g., at a decision node of the HMS. In some implementations the first stage of analysis may be triggered periodically, e.g., at least once every X seconds, where X is a configurable parameter of the HMS. In some implementations, a detection that a health metric record comprises a particular string (e.g., a detection during the writing of the record into the HMS repository that the record contains the phrase "node unreachable") may immediately trigger the first analysis. If the first stage of analysis indicates that the probability that MN1 has entered an unhealthy state (e.g., a failure state or an overload state) exceeds a threshold probability P1 (as detected in element 1410), a rapid-response mitigation action may be initiated (element 1413). Different types of mitigation actions may be undertaken in various embodiments, including for example failover from the monitored node MN1 (such as a primary PPE of a PPE pair set up for a VPN connection as described earlier) to another service node MN2 (such as a secondary PPE), e.g., with the goal of minimizing disruption to customer workloads. If the probability of an unhealthy state is estimated to be less than P1 (as also detected in element 1410), the HMS may continue metrics collection and turn its attention to other monitored nodes and/or metrics gathered over later time periods (element 1425).

In the case where the rapid-response mitigation action was initiated, a second stage of analysis may be performed at the decision layer of the HMS, e.g., asynchronously with respect to the mitigation action (element 1416). The second stage of analysis may include, for example, a larger set of health metrics sources, different types of statistical analysis, and/or a longer metrics collection period than the first analysis phase. In some implementations the second phase of analysis may include an examination of historical trends, e.g., to check how many times MN1 had been reported as potentially unhealthy during some interval, and whether MN1's reported unhealthy states correlate with high workload levels, poor service response times/throughputs, or other measures of service quality. The results of the second phase of analysis may lead to a decision to initiate a longer-term remediation action in some cases (element 1419). Different remediation thresholds may be used for different services. In one embodiment, for example, if the second phase of analysis results in an estimation that MN1 did in fact reach an unhealthy state and has done so in the recent past, a remediation action distinct from the mitigation action may be initiated. For example, a request may be sent to the provisioning manager of the service to provide a permanent hardware replacement and/or software re-install for MN1 (element 1422). Regardless of the outcome of the second phase of analysis, the HMS may continue collecting health metrics and analyze other monitored nodes of the service (element 1425), repeating the set of operations illustrated in elements 1401 onwards in the depicted embodiment. As mentioned earlier, in at least some embodiments, the HMS may monitor its own effectiveness and use machine learning or other techniques to improve its results over time.

Scalable Routing Service

Figure 15:
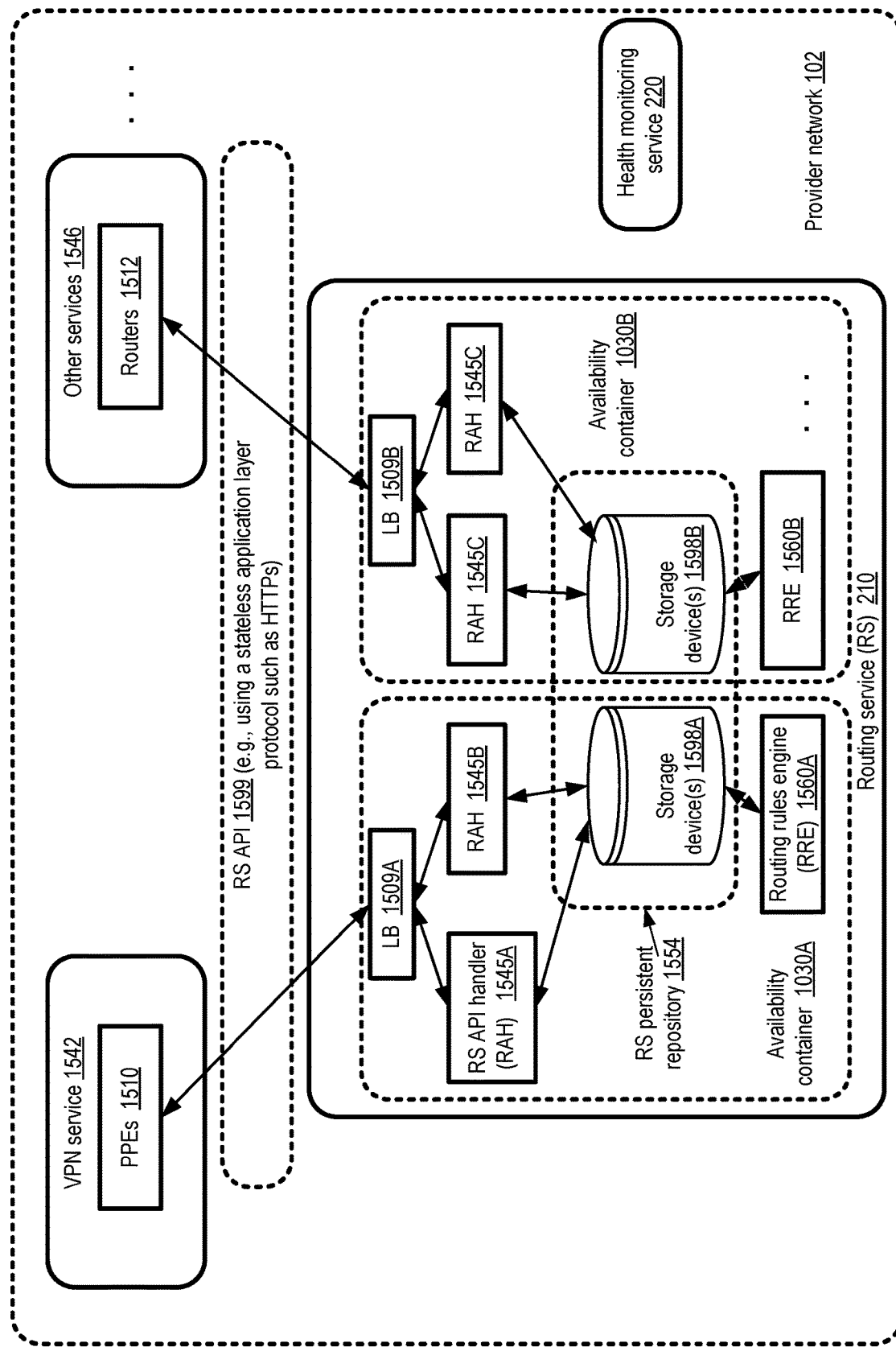
FIG. 15 illustrates an example system environment in which a scalable, highly-available routing service may be implemented at a provider network, according to at least some embodiments.

Dynamic routing protocols such as BGP (Border Gateway Protocol) and OSPF (Open Shortest Path First) are commonly used to enable reachability between endpoints distributed around the Internet. In some of these protocols, such as BGP, fairly complex rules may govern route selection, and numerous types of preferences or parameters (such as multi-exit discriminators) may have to be specified to achieve the desired reachability. The peer-to-peer decentralized nature of such protocols may result in it taking a substantial amount of time to converge on optimal routes. Furthermore, BGP relies on the underlying TCP for ordered delivery of routing messages and also for health checks, which can lead to problematic situations in which BGP peers reach incorrect conclusions about each other's health status. For all these reasons, it may make sense for a provider network operator to streamline at least some of the routing-related decision-making required for connectivity between various types of service endpoints and the clients of the services. FIG. 15 illustrates an example system environment in which a scalable, highly-available routing service may be implemented at a provider network, according to at least some embodiments.

In the depicted embodiment, a multi-layered routing service (RS) 210 may be implemented at provider network 102. A front-end layer of the RS may comprise a set of RS API handlers (RAHs) 1545, such RAHs 1545A, 1545B, 1545C and 1545D that are configured to receive routing information formatted in accordance with a set of programmatic interfaces 1599 defined by the RS and saving the received information within a persistent repository 1554 of the routing service. In some embodiments, the routing service APIs may be designed for use exclusively within the provider network, so that, for example, routing information received in accordance with the APIs at a PPE or other routing device may have to be translated (e.g., into BGP advertisements) before it is sent to external entities. In other embodiments, the routing service APIs may be exposed to at least some routing devices of external networks. The repository may, for example, comprise nodes of a replicated highly-available and scalable storage service or a database service with a plurality of storage devices 1598 (e.g., 1598A and 1598B). In some embodiments, a relational or non-relational database service implemented at the provider network may be used. The routing information may be received from a variety of routing devices of the provider network 102, such as PPEs 1510 of a VPN connectivity service 1542 of the kind described earlier, as well as from virtual and/or physical routers 1512 of other services 1546 implemented at the provider network. The RAHs 1545 may also be configured to disseminate route updates and/or optimal routing results, determined at the back-end layer of the RS to the routing devices 1510 and/or 1512. The back-end layer of the RS may comprise a number of logically-centralized but physically-distributed routing rules engines (RREs) 1560, such as RRE 1560A and 1560B. The RREs may arrive at routing decisions (such as determining forwarding table or FIB (forwarding information base) entries) based on the analysis of the information stored in the persistent repository 1554 by the RAHs. In at least one embodiment, one or more load balancers 1509, such as 1509A and 1509B, may be configured as part of the front-end layer of the routing service, e.g., so that incoming routing updates are distributed among the RAHs in an equitable manner. As shown, the entities at the different layers of the RS 210 may be physically distributed among a plurality of availability containers 1030 (similar to the availability containers discussed in the context of FIG. 10), such as 1030A and 1030B. As a result, the RS 210 may be made more resilient to large-scale failure events such as power outages that affect entire data centers. A health monitoring service 220 may be responsible for collecting health metrics regarding various components of the routing service in some embodiments, e.g., including self-health-results, path emulation testing results, status API invocation results, and/or peer health check results as described earlier. The HMS 220 may take similar rapid-response mitigation and longer-term remediation actions based on various triggering criteria for the routing service nodes in at least some such embodiments.

According to some embodiments, in contrast to APIs used for session-oriented protocols such as BGP, the RS API 1599 may be implemented using a stateless application-layer protocol such as HTTPs or some other variant of HTTP. In such embodiments, the RAHs 1545 may not be required to maintain or store persistent state information, and it may therefore be much easier to recover from RAH failures (e.g., by simply instantiating a replacement or failover RAH) than if a stateful or session-oriented protocol were being used. The routing devices such as the VPN PPEs 1510 may themselves communicate using BGP, OSPF and/or other commonly-used protocols with routers of external networks (or even with some other routers of the provider network 102), and in effect translate incoming routing information from such protocols into the RS protocol 1599 for transmission to the RAHs 1545. In at least some embodiments, the PPEs and/or other routers that use the RS API 1599 may insert sequence numbers into the messages they send to the RAHs, e.g., so that the routing information can be examined in the correct order by the RREs 1560. The RAHs may also transmit outbound routing table entries and/or forwarding table entries to the PPEs and routers using the RS API, and the outbound routing information may be re-formatted at the PPEs/routers in accordance with protocols such as BGP or OSPF before being sent on to the customer network routers and/or other routers outside the provider network. Thus, routing information translations may be performed in both directions by PPEs or other routing devices of the provider network in some embodiments: translations from BGP advertisements (or messages of other routing protocols) to RS protocol messages for routing information pertaining to external networks, and translations of RS protocol messages from the routing service into BGP advertisements (or messages of other routing protocols) directed to external networks. In some embodiments, a provider network router 662 may receive the external networks' routing updates via a direct physical link 654 at a router co-location facility as shown in FIG. 6), and may translate the routing updates into RS protocol messages. Similarly, such provider network routers may also use the direct physical links 654 for outbound BGP advertisements to external networks.

In one embodiment in which VPG-IVNs are being used for VPN connectivity to customer data centers as described earlier, for example, an RAH 1545 may receive a particular message compliant with an HHTP-based RS API from a PPE 1510. The message may indicate a route to a particular network destination (such as a customer device 145) at a customer data center (such as C-DC 140 of FIG. 1). The PPE 1510 that sent the message may have received the route in a BGP advertisement during a BGP session established with a customer router or customer gateway, for example, using the PPE's BGP module 302. The RSP module 312 of the PPE may be responsible for translating or converting the BGP route information into a format in accordance with the RS protocol and sending the route on to an RAH 1545 (via a load balancer 1509 in some embodiments). Based on the contents of the message, the RAH may modify a routing information base (RIB) stored at a persistent data store 1554. The RIB may include routing entries of endpoints of a VPN connection established between a first set of resources and a second set of resources, where the first set of resources is located within the customer data center (e.g., one or more customer devices 145) and the second set of resources is located within the provider network (e.g., a customer instance 120 at a customer's IVN 124). One or more RREs 1560 of the routing service may analyze the changes to the RIB that were made based on the latest message as well as earlier messages received from the same PPE or other PPEs, and generate at least one entry of a forwarding information base (FIB) associated with the RIB. The FIB entry or entries may be distributed among a variety of routing devices within (and in some cases external to) the provider network, including for example the PPE from which the RIB change was received, and may be used subsequently for routing packets of customer data in one or both directions of the VPN pathway.

In some embodiments, some of the functions of the different layers of the routing service 210 shown in FIG. 15 may be consolidated into fewer layers. For example, a single type of routing service node may receive routing update messages from PPEs and/or other routing devices and also perform the RIB-to-FIB computations in one embodiment, combining at least some of the functions of RAHs 1545 and RREs 1560. In at least one such implementation, SSH (secure shell) tunnels may be used for messages of the routing service API, e.g., instead of or in addition to HTTP-based protocols. In one implementation, routing service nodes may use local memory or storage devices to store RIB (and/or FIB) entries, instead of using a separate persistent repository 1554 to store RIB and/or FIB entries. In such a scenario, in the event that the locally-stored routing information is lost (e.g., due to a failure) at a routing service node, the node may be responsible for re-collecting the lost information from the PPEs or other routing devices from which the information was received via the routing service API.

In at least one embodiment, the routing service may be used as a logical intermediary for exchanging routing information among a plurality of provider network services. For example, routers affiliated with one service (such as a database service whose content may be used as input for some high-end parallel processing tasks) may provide routing information pertaining to some first set of destinations (e.g., database instances) to the routing service via the RS API, and routers associated with a second service (such as a high-end parallel processing service that may store some of its results at the database service) may also provide routing information pertaining to the parallel processing nodes to the RS via the RS API. The RREs of the RS may then generate the most appropriate routes for traffic to flow in either direction between the two services, and propagate the computed routes to the routers of the two services, again via the RS API.

Figure 16:
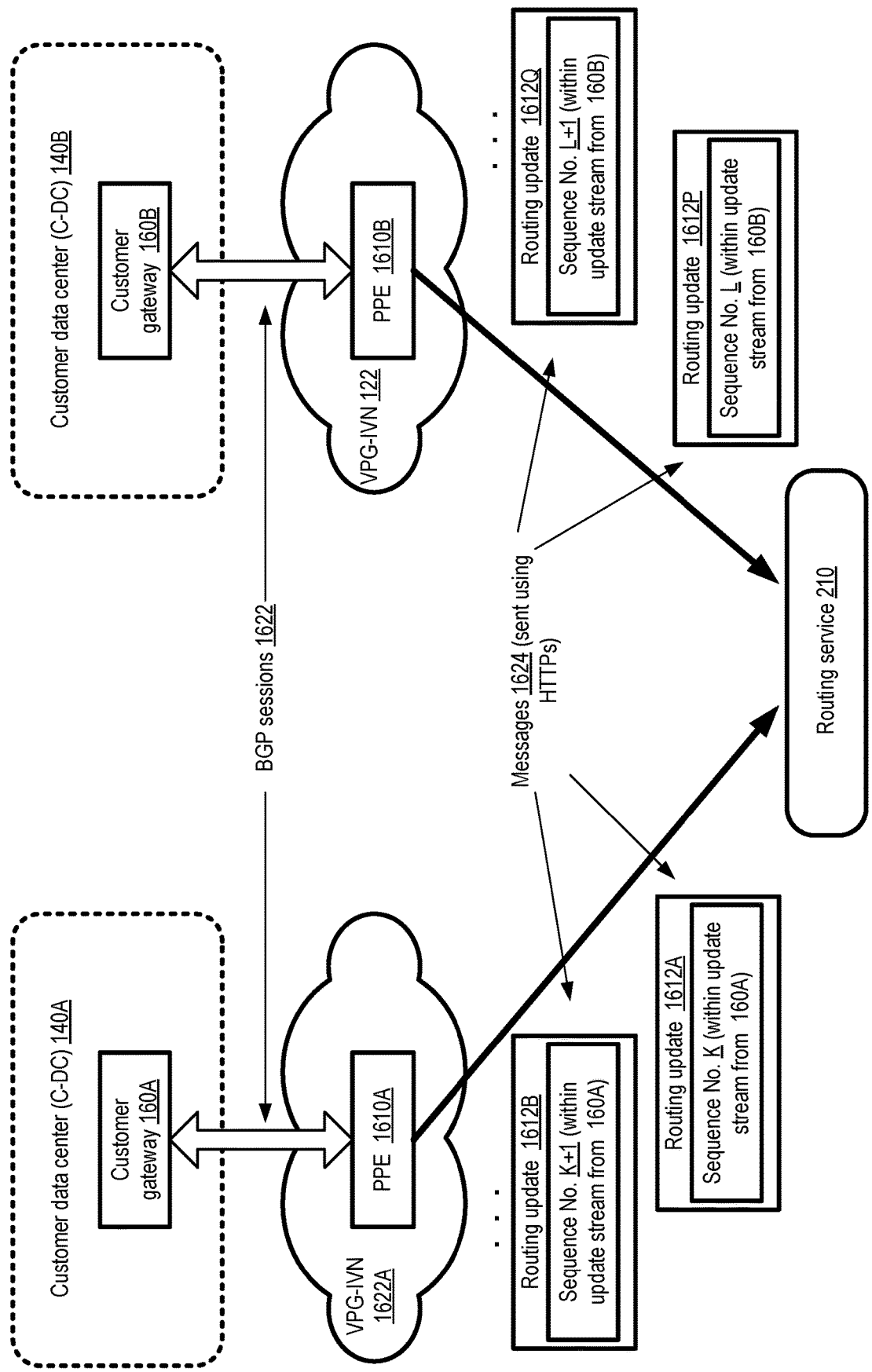
FIG. 16 illustrates examples of the addition of sequence numbers to routing updates, according to at least some embodiments.

When making routing decisions based on a series of updates received from a source such as a customer data center gateway or router, the order in which the updates were received may have to be taken into account, e.g., so that the decisions are not made on the basis of no-longer-valid routing updates. Some session-oriented routing protocols may rely on the in-order delivery of packets by TCP (or some other lower layer protocol) to establish the update order. However, when a stateless HTTP-based protocol is being used for conveying routing updates, in which at least some the application-layer messages may be lost or delivered out of order, the participants in the protocol may be responsible for generating and including ordering information such as application-layer sequence numbers within the body or payload portions of the messages (as distinct from any sequence numbers which may be included in the headers used by lower-level protocols). FIG. 16 illustrates examples of the addition of sequence numbers to routing updates, according to at least some embodiments.

Two customer data centers 140A and 140B are shown, each comprising a respective customer gateway 160 (e.g., gateway 160A in data center 140A, and gateway 160B in data center 140B). The gateways 160 establish respective BGP sessions 1622 with PPEs 1610A and 1610B within VPG-IVNs 1622A and 1622B respectively, using techniques similar to those described earlier for VPN connectivity establishment. After the BGP sessions have been established, the customer gateways 160 transmit routing advertisements or updates via the sessions to the PPEs 1610. Customer gateway 160A may advertise routing changes pertaining to customer devices at data center 140A, while customer gateway 160B may advertise routing changes pertaining to customer devices at data center 140B. A sequence of such routing advertisements may be received at each of the PPEs from each of the customer gateways in the depicted embodiment.

At each PPE 1610, in response to receiving a BGP routing update from a customer gateway, a corresponding message 1624 formatted according to the routing service protocol may be generated and sent to an RAH of the routing service. As shown, the PPE 1610 may insert into each message (e.g., in the body or payload portion) a sequence number indicative of the order of the update contained in the message with respect to other routing updates originating at the same source (e.g., customer gateway 160). Respective sequence numbers K and (K+1) may be inserted within successive routing update messages 1612A and 1612B sent by PPE 1610A on the basis of corresponding BGP updates from customer gateway 160A, for example. Similarly, in the depicted embodiment, respective sequence numbers L and (L+1) may be inserted within the body portions of successive routing update messages 1612P and 1612Q sent by PPE 1610B on the basis of corresponding BGP updates from customer gateway 160B. In some embodiments, an indication of the sequence number and the source for each of the routing updates may be stored within the RS persistent repository 1554, and may be read from the repository by the RREs 1560 in order to ensure that routing decisions are not made based on out-of-date information. It is noted that other sequence numbers (which may be used for time-window based flow control and/or retransmissions by TCP or other similar lower-level protocols) may also be added within the headers of the update messages, but such sequence numbers may not be available to or used by the routing service protocol which may be implemented at the application layer.

Figure 17:
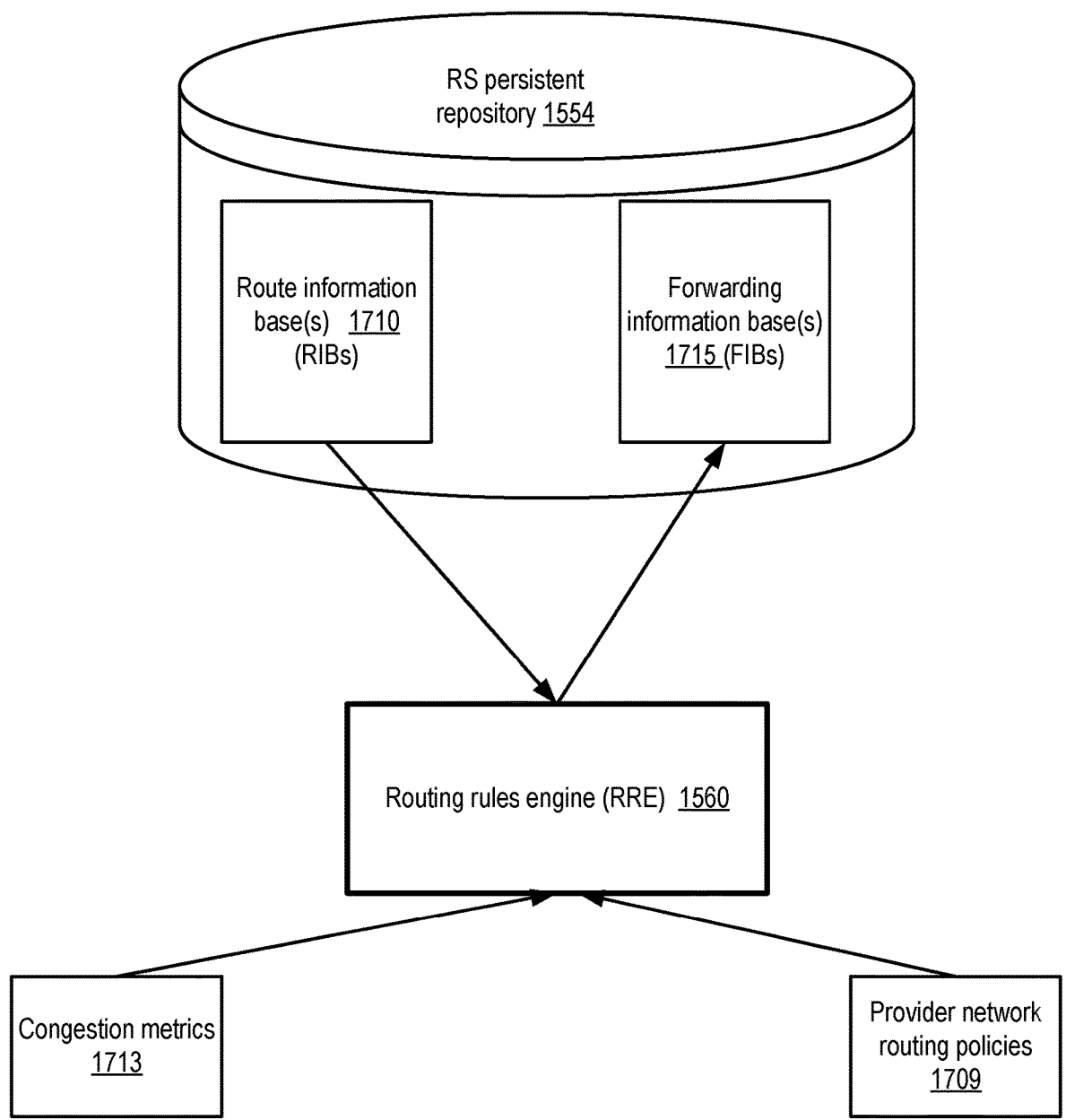
FIG. 17 illustrates the generation of forwarding information base (FIB) entries at a rules engine layer of a routing service, according to at least some embodiments.

As mentioned earlier, the routing rules engines 1560 may be responsible for implementing the appropriate set of routing algorithms on the routing information stored in the RS repository to determine the best available routes between pairs of endpoints inside and outside the provider network. FIG. 17 illustrates the generation of forwarding information base (FIB) entries at a rules engine layer of a routing service, according to at least some embodiments. In the depicted embodiment, an RRE may make its RIB-to-FIB route computations based on the updates to the RIB(s) 1710 within the routing service repository 1554, congestion metrics 1713 received from various parts of the provider network and/or external entities, and/or a set of provider network routing policies 1709. The policies 1709 may, for example, govern how frequently the results of RIB-to-FIB computations need to be disseminated, how frequently the computations have to be performed, how various factors such as customer-specified preferences and/or service-level agreements are to be prioritized when selecting routes, and so on. The congestion metrics 1713 may be obtained from various monitors distributed around the provider network, edge nodes of a content delivery network (CDN) service implemented by the provider network, and so on in different embodiments.

Figure 18:
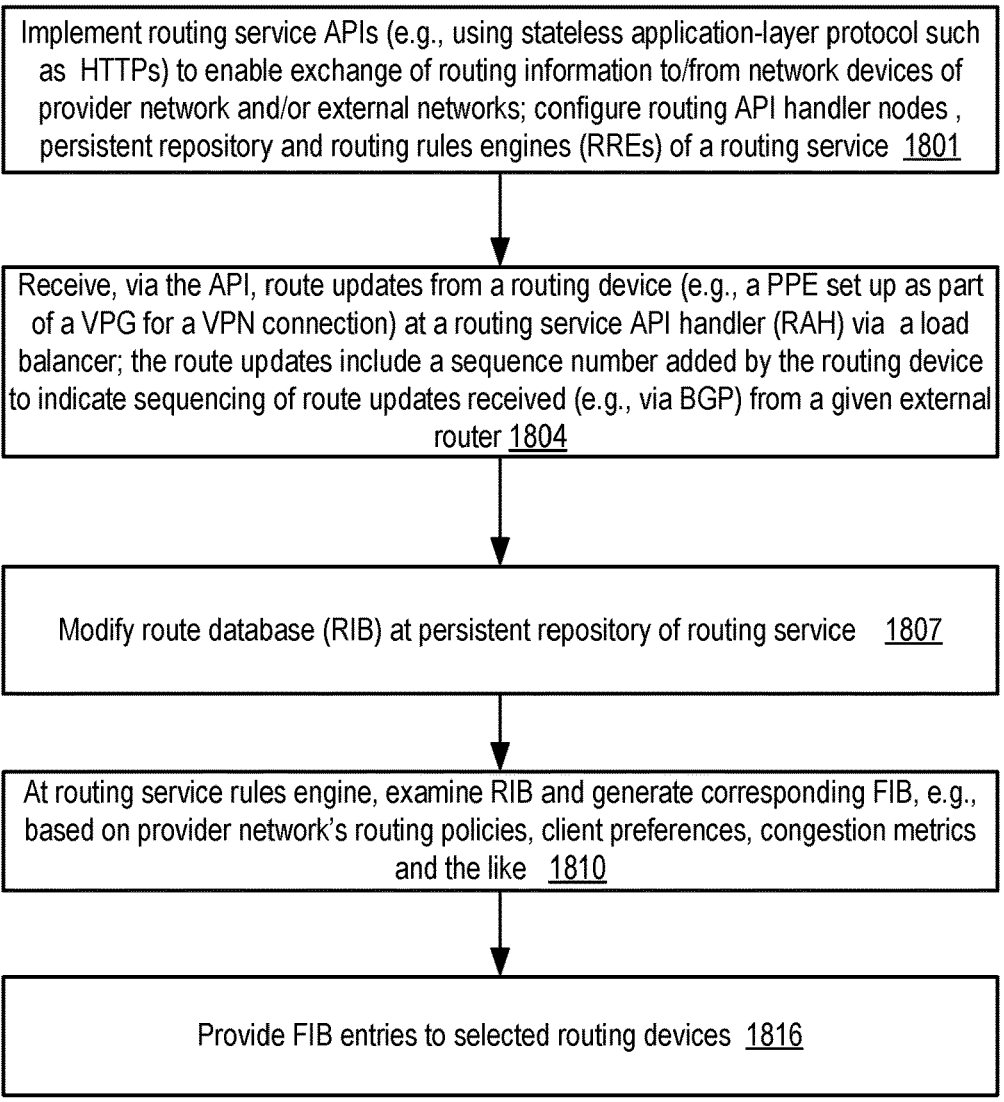
FIG. 18 is a flow diagram illustrating aspects of operations that may be performed to implement a scalable, highly available routing service, according to at least some embodiments.

FIG. 18 is a flow diagram illustrating aspects of operations that may be performed to implement a scalable, highly available routing service, according to at least some embodiments. As shown in element 1801, a set of routing service APIs may be defined and implemented to enable the exchange of routing information using a stateless application layer protocol to/from network devices inside and/or outside a provider network. A number of nodes at each layer of the routing service may be configured: e.g., some number of routing API handlers (RAHs), routing rules engines (RREs) and repository nodes may be established. The number of nodes at each layer, and the physical distribution of the nodes among various provider network data centers and availability containers may be changed dynamically over time in at least some embodiments, e.g., based on the workload trends, failure events and the like. In at least some embodiments, a set of load balancers may be configured to distribute incoming route update messages among the RAH nodes.

An RAH of the service may receive route updates from a routing device (e.g., a PPE set up as part of a VPG for a VPN connection) (element 1804), e.g., via a load balancer. At least some of the route updates may each include a respective sequence number added by the routing device to indicate sequencing of route updates received (e.g., via BGP) from a given external router in some implementations. The contents of a routing information base (RIB) stored at a persistent repository used by the routing service may be modified based on the route updates (element 1807). At a routing service rules engine (RRE), the changes to the RIB may be examined and generate corresponding FIB entries may be generated, e.g., based on provider network's routing policies, client preferences, congestion metrics and the like (element 1810). The FIB entries may be provided to selected routing devices (including, for example, the PPE from which the route updates were received) (element 1813), and the FIB entries may be used to make packet forwarding decisions at the routing devices.

It is noted that in various embodiments, operations other than those illustrated in the flow diagram of FIGS. 9, 14 and 18 may be used to implement the techniques of VPN connectivity management using instance-based virtual private gateways, health monitoring, and routing described above. Some of the operations shown may not be implemented in some embodiments or may be implemented in a different order, or in parallel rather than sequentially.

Use Cases

The techniques described above, of utilizing compute instances for implementing virtual private gateways, setting up a multi-phase health monitoring service to implement high-availability and fault tolerance, and/or setting up a scalable and available routing service may each be useful in a number of scenarios. As more and more customer applications are migrated to provider networks, the need for secure channels between customer data centers or office premises and resources within the provider network is going to increase even further. Using commodity instance hosts for VPGs is likely to be much more cost-efficient than relying on expensive, hard-to-upgrade and hard-to-maintain proprietary networking equipment. Furthermore, by distributing the gateway responsibilities among gateway PPEs instantiated at numerous hosts, the impact of a failure at any one gateway is likely to be much smaller than when VPN gateway functions for numerous customers are combined within large proprietary servers.

A routing service that supports a less session-oriented protocol than some common approaches such as BGP, and in which routing decisions are made in a logically centralized fashion instead of relying on convergence to be achieved eventually between potentially distrustful peers, may make routing more predictable and efficient. A general-purpose health monitoring service that relies on a variety of different health metric sources and multiple levels of health analysis to take short-term and long-term actions may help increase the availability of various provider network services (including, for example, the VPN connectivity service and/or the routing service).

Illustrative Computer System

Figure 19:
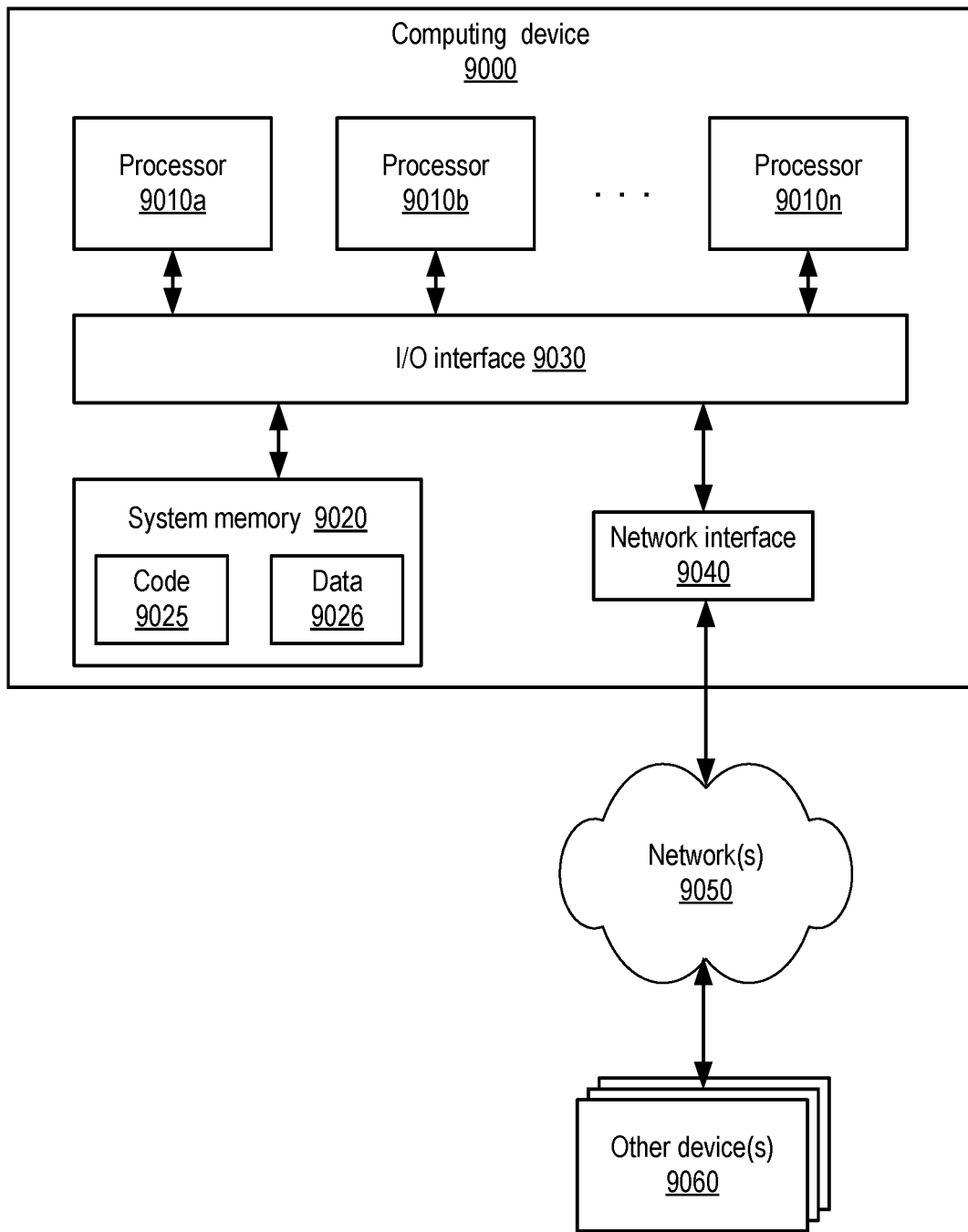
FIG. 19 is a block diagram illustrating an example computing device that may be used in at least some embodiments.

In at least some embodiments, a server that implements a portion or all of one or more of the technologies described herein, including the techniques to implement the PPEs, instance hosts, various front-end and back-end health monitoring service nodes and/or routing service nodes, may include a general-purpose computer system that includes or is configured to access one or more computer-accessible media. FIG. 19 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 18, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 18 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 19 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
performing, at one or more computing devices comprising one or more processors and memory:
determining that secure network connectivity is to be established between a first premise outside a provider network and a second premise outside the provider network using computing resources within the provider network;
establishing (a) a first secure network channel comprising a first plurality of tunnels for communications between the first premise and a first packet processing engine configured within the provider network, and (b) a second secure network channel comprising a second plurality of tunnels for communications between the second premise and a second packet processing engine configured within the provider network, wherein the first plurality of tunnels is separate from the second plurality of tunnels, and the first and second packet processing engines are implemented by virtual machine instances managed by hypervisors on instance hosts of the provider network; and
causing a network packet generated at the first premise to be routed through at least one of the first plurality of tunnels of the first packet processing engine to the second packet processing engine, wherein the network packet is routed via at least one of the second plurality of tunnels of the second packet processing engine to the second premise.

2. The method as recited in claim 1, wherein the first plurality of tunnels comprises at least one VPN (virtual private network) tunnel.

3. The method as recited in claim 1, further comprising performing, at the one or more computing devices:
configuring the first packet processing engine as a primary packet processing engine of a group of packet processing engines assigned to process packets of the first premise, wherein the group comprises a third packet processing engine;
subsequent to a detection of a failure associated with the primary packet processing engine, causing one or more packets originating at the first premise to be routed to the second premise via the third packet processing engine.

4. The method as recited in claim 1, further comprising performing, at the one or more computing devices:
establishing an isolated virtual network of the provider network to be used at least in part as a virtual private gateway; and
configuring at least the first packet processing engine within the isolated virtual network.

5. The method as recited in claim 1, wherein the first packet processing engine is implemented at a first location associated with the first premise and the second packet processing engine is implemented as a second location associated with the second premise.

6. The method as recited in claim 1, wherein the first packet processing engine comprises one or more of: (a) a BGP (Border Gateway Protocol) processing module, (b) an IPSec (Internet Protocol Security) processing module, (c) an IKE (Internet Key Exchange) processing module, (d) an SSL/TLS (Secure Sockets Layer/Transport Layer Security) processing module, (e) a GRE (Generic Routing Encapsulation) processing module or (f) a processing module for a custom routing protocol of a routing service of the provider network.

7. The method as recited in claim 1, wherein the first packet processing engine is implemented at least in part using a first resource with a first performance capability rating, the method further comprising, performing at the one or more computing devices:
configuring, in response to a determination that a particular metric associated with the first packet processing engine satisfies a criterion, a replacement packet processing engine for the first packet processing engine, wherein the replacement packet processing engine is implemented at least in part using a different resource with a different performance capability rating.

8. A system, comprising:
one or more computing devices;
wherein the one or more computing devices include instructions that upon execution on or across one or more processors cause the one or more computing devices to:
determine that secure network connectivity is to be established between a first premise outside a provider network and a second premise outside the provider network using computing resources within the provider network;
establish (a) a first secure network channel comprising a first plurality of tunnels for communications between the first premise and a first packet processing engine configured within the provider network, and (b) a second secure network channel comprising a second plurality of tunnels for communications between the second premise and a second packet processing engine configured within the provider network, wherein the first plurality of tunnels is separate from the second plurality of tunnels, and the first and second packet processing engines are implemented by virtual machine instances managed by hypervisors on instance hosts of the provider network; and cause a network packet generated at the first premise to be routed through at least one of the first plurality of tunnels of the first packet processing engine to the second packet processing engine, wherein the network packet is routed via at least one of the second plurality of tunnels of the second packet processing engine to the second premise.

9. The system as recited in claim 8, wherein the first secure network channel comprises a VPN (virtual private network) connection.

10. The system as recited in claim 8, wherein the one or more computing devices include further instructions that upon execution on or across the one or more processors further cause the one or more computing devices to:

configure the first packet processing engine as a primary packet processing engine of a group of packet processing engines assigned to process packets of the first premise, wherein the group comprises a third packet processing engine configured as a secondary packet processing engine of the group;

subsequent to a detection of a failure associated with the primary packet processing engine, cause one or more packets originating at the first premise to be routed to the second premise via the third packet processing engine.

11. The system as recited in claim 8, wherein the one or more computing devices include further instructions that upon execution on or across the one or more processors further cause the one or more computing devices to:

establish an isolated virtual network of the provider network to be used at least in part as a virtual private gateway; and configure at least the first packet processing engine within the isolated virtual network.

12. The system as recited in claim 8, wherein the first packet processing engine is implemented on a provider router at a co-location facility, and the first plurality of tunnels is implemented over a dedicated physical link between the provider router and a customer router at the co-location facility.

13. The system as recited in claim 8, wherein the first packet processing engine comprises one or more of: (a) a BGP (Border Gateway Protocol) processing module, (b) an IPSec (Internet Protocol Security) processing module, (c) an IKE (Internet Key Exchange) processing module, (d) an SSL/TLS (Secure Sockets Layer/Transport Layer Security) processing module, (e) a GRE (Generic Routing Encapsulation) processing module or (f) a processing module for a custom routing protocol of a routing service of the provider network.

14. The system as recited in claim 8, wherein the one or more computing devices include further instructions that upon execution on or across the one or more processors further cause the one or more computing devices to:

instantiate one or more virtual machine instances at an isolated virtual network established on behalf of a client of the provider network; and in response to a programmatic request from the client for connectivity between the first premise and the isolated virtual network, cause one or more packets originating at the first premise to be transmitted to the one or more virtual machine instances via one or more packet processing engines, including the first packet processing engine.

15. One or more non-transitory computer-accessible storage media storing program instructions that when executed on or across one or more processors cause one or more computer systems to:

determine that network connectivity is to be established between a first premise outside a provider network and a second premise outside the provider network using computing resources within the provider network;

establish (a) a first network channel comprising a first plurality of tunnels for communications between the first premise and a first packet processing engine configured within the provider network, and (b) a second network channel comprising a second plurality of tunnels for communications between the second premise and a second packet processing engine configured within the provider network, wherein the first plurality of tunnels is separate from the second plurality of tunnels, and the first and second packet processing engines are implemented by virtual machine instances managed by hypervisors on instance hosts of the provider network; and cause a network packet generated at the first premise to be routed through at least one of the first plurality of tunnels of the first packet processing engine to the second packet processing engine, wherein the network packet is routed via at least one of the second plurality of tunnels of the second packet processing engine to the second premise.

16. The one or more non-transitory computer-accessible storage media as recited in claim 15, wherein the first network channel comprises a VPN (virtual private network) connection.

17. The one or more non-transitory computer-accessible storage media as recited in claim 15, storing further program instructions that when executed on or across the one or more processors cause the one or more computer systems to:

configure the first packet processing engine as a primary packet processing engine of a group of packet processing engines assigned to process packets of the first premise, wherein the group comprises a third packet processing engine configured as a secondary packet processing engine of the group;

subsequent to a detection of a failure associated with the primary packet processing engine, cause one or more packets originating at the first premise to be routed to the second premise via the third packet processing engine.

18. The one or more non-transitory computer-accessible storage media as recited in claim 15, storing further program instructions that when executed on or across the one or more processors cause the one or more computer systems to:

establish an isolated virtual network of the provider network to be used at least in part as a virtual private gateway; and configure at least the first packet processing engine within the isolated virtual network.

19. The one or more non-transitory computer-accessible storage media as recited in claim 15, wherein the first packet processing engine is implemented at a first location associated with the first premise and the second packet processing engine is implemented as a second location associated with the second premise.

20. The one or more non-transitory computer-accessible storage media as recited in claim 15, wherein the first packet processing engine comprises one or more of: (a) a BGP (Border Gateway Protocol) processing module, (b) an IPSec (Internet Protocol Security) processing module, (c) an IKE (Internet Key Exchange) processing module, (d) an SSL/TLS (Secure Sockets Layer/Transport Layer Security) processing module, (e) a GRE (Generic Routing Encapsulation) processing module or (f) a processing module for a custom routing protocol of a routing service of the provider network.

* * * * *